United States Patent
Hanada et al.

(10) Patent No.: US 6,798,175 B2
(45) Date of Patent: Sep. 28, 2004

(54) POWER SUPPLY CIRCUIT

(75) Inventors: Yuji Hanada, Saitama (JP); Shinichi Kakiuchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 226 days.

(21) Appl. No.: 09/828,940

(22) Filed: Apr. 10, 2001

(65) Prior Publication Data

US 2001/0028571 A1 Oct. 11, 2001

(30) Foreign Application Priority Data

| Apr. 11, 2000 | (JP) | 2000-109125 |
| Apr. 14, 2000 | (JP) | 2000-113509 |
| Apr. 14, 2000 | (JP) | 2000-113710 |
| May 16, 2000 | (JP) | 2000-143002 |

(51) Int. Cl.[7] .................................................. H02J 7/04
(52) U.S. Cl. ........................................ 320/166; 320/164
(58) Field of Search ............................... 320/166, 164, 320/121, 126, 127, 134, 136; 363/59, 60

(56) References Cited

U.S. PATENT DOCUMENTS

| 4,250,413 A | | 2/1981 | Kawasaki et al. ........... 327/398 |
| 5,408,842 A | * | 4/1995 | Goto et al. .................... 62/230 |
| 5,754,384 A | * | 5/1998 | Ashley .......................... 361/93 |
| 5,982,153 A | * | 11/1999 | Nagai et al. ................. 320/164 |
| 6,437,538 B1 | * | 8/2002 | Tsurumi et al. ............. 320/116 |

FOREIGN PATENT DOCUMENTS

| JP | 63-202218 | * | 8/1988 |
| JP | 11252807 | | 9/1999 |

* cited by examiner

Primary Examiner—Lawrence Luk
(74) Attorney, Agent, or Firm—Greenblum & Bernstein, P.L.C.

(57) ABSTRACT

A power supply circuit, which is connected to a battery having an overcurrent protective device, includes a capacitor which is connected in parallel to the battery to be charged by the battery, and a restricting device which restricts an output current of the battery so that the output current of the battery is not interrupted by the overcurrent protective device while the capacitor is being charged with the battery.

23 Claims, 17 Drawing Sheets

POWER SUPPLY CIRCUIT

BACKGROUND OF THE INVENTION

1. Field of the Invention

The present invention relates to a power supply circuit provided with a capacitor for accommodating the voltage regulation (voltage variation) of a battery.

2. Description of the Related Art

In recent years, power supply circuits having a capacitor which is connected (in parallel) to a battery to suppress the voltage regulations of a battery have been proposed. Since a capacitor whose ESR (equivalent series resistance) is low, and whose accumulate capacitance is large, is suitable for such power supply circuits, an electric double layer capacitor is mainly used.

However, in the case where the electric double layer capacitor is connected in parallel to a secondary (or rechargeable) battery (e.g., a rechargeable lithium-ion battery) provided with an overcurrent protective circuit, a large (heavy) electric current is drawn from the battery when the electric double layer capacitor is charged, which may actuate the overcurrent protective circuit to interrupt the output current of the battery to the electric double layer capacitor. Accordingly, if the overcurrent protective circuit is actuated to interrupt the output current of the battery to the electric double layer capacitor, since the operator cannot determine whether the overcurrent protective circuit has been actuated, in most cases an operator mistakenly determines that the battery is empty ('flat') even though the battery is not, or mistakenly determines that the electronic device to which the power supply circuit is connected has broken down. If the operator mistakenly determines that the battery is empty, the battery ends up being replaced by a new one even though the battery still has enough power, and the remaining power of the battery is wasted.

SUMMARY OF THE INVENTION

An object of the present invention is to provide a power supply circuit provided with a capacitor for accommodating the voltage regulations(voltage variations) of a battery, wherein the overcurrent protective circuit of the battery can be prevented from being actuated while the capacitor is being charged.

To achieve the object mentioned above, according to an aspect of the present invention, a power supply circuit is provided, which is connected to a battery having an overcurrent protective device, the power supply circuit including a capacitor which is connected in parallel to the battery to be charged by the battery, and a restricting device which restricts an output current of the battery so that the output current of the battery is not interrupted by the overcurrent protective device while the capacitor is being charged with the battery.

Preferably, the power supply circuit further includes a voltage detector which detects a terminal voltage across the capacitor, wherein the restricting device restricts the output current of the battery in accordance with the terminal voltage detected by the voltage detector.

Preferably, the restricting device restricts the output current of the battery in accordance with the terminal voltage detected by the voltage detector so that the output current of the battery becomes maximum within a range in which the overcurrent protective device is not actuated to interrupt the output current of the battery to the power supply circuit.

In an embodiment, the restricting device includes a variable resistor via which the battery is connected to the capacitor, and a controller which controls the output current of the battery by varying a resistance value of the variable resistor in accordance with the terminal voltage detected by the voltage detector.

In an embodiment, the restricting device includes a plurality of resistors connected in parallel via which the battery is connected to the capacitor; a plurality of switches with which each of the plurality of resistors can be connected to and disconnected from one of the battery and the capacitor; and a controller which controls the plurality of switches independently of one another in accordance with the terminal voltage detected by the voltage detector.

In an embodiment, the restricting device includes a plurality of field effect transistors connected in parallel via which the battery is connected to the capacitor, and a controller which controls an ON/OFF state of each of the plurality of field effect transistors in accordance with the terminal voltage detected by the voltage detector.

In an embodiment, the restricting device includes a field effect transistor via which the battery is connected to the capacitor; and a controller which controls the output current of the battery by controlling a voltage across a gate and a source of the field effect transistor in accordance with the terminal voltage detected by the voltage detector.

In an embodiment, the restricting device includes a transistor, wherein a collector of the transistor is connected to a gate of the field effect transistor while an emitter of the transistor is connected to ground, and the controller controls the voltage across the gate and a source of the field effect transistor by controlling a base voltage of the transistor.

In an embodiment, the power supply circuit further includes a plurality of resistors and a plurality of switches which are turned ON and OFF so that a base of the transistor is connected to and disconnected from the ground via the plurality of resistors, respectively. The controller controls the base voltage of the transistor by changing ON/OFF states of the plurality of switches.

According to an aspect of the present invention, a power supply circuit is provided, which is connected to a battery having an overcurrent protective device, the power supply circuit including a capacitor, a first switch provided in a primary path for connecting the battery with the capacitor, a second switch provided in an alternative path for connecting the battery with the capacitor, a voltage detector which detects a terminal voltage across the capacitor, and a charge control device which controls a switching operation of the first switch to intermittently charge the capacitor with the battery via the primary path in the case where the terminal voltage Vc across the capacitor is smaller than a predetermined threshold value. The charge control device switches the primary path to the alternative path to continuously charge the capacitor with the battery via the alternative path in the case where the terminal voltage across the capacitor exceeds the predetermined threshold value.

In an embodiment, a duration of an ON state of the first switch in an intermittent charging operation, in which the capacitor is charged intermittently, is shorter than a time necessary for the overcurrent protective device to detect an overcurrent of the battery.

In an embodiment, a duration of an ON state of the to first switch in an intermittent charging operation, in which the capacitor is charged intermittently, is shorter than a duration from the moment the battery is connected to the capacitor to the moment an output current of the battery exceeds an overcurrent detection value of the overcurrent protective device.

According to an aspect of the present invention, a power supply circuit is provided, which is connected to a battery having an overcurrent protective device, the power supply circuit including a capacitor, an adjusting condenser connected in parallel with the battery, the adjusting condenser having a capacitance so that when the capacitor is charged with the battery, the overcurrent protective device is not actuated to interrupt an output current of the battery to the power supply circuit; a switching element with which the adjusting condenser can be connected to and disconnected from the capacitor; and a charge control device which controls a switching operation of the switching element to intermittently charge the capacitor with power output from the battery and the adjusting condenser.

In an embodiment, the capacitor is charged with power output from the battery and the adjusting condenser when the switching element is ON, and the capacitor is charged with power output only from the battery when the switching element is OFF.

In an embodiment, the power supply circuit further includes a voltage detector which detects a terminal voltage across the capacitor. In the case where the terminal voltage becomes one of equal to and greater than a predetermined voltage, the charge control device stops the switching operation of the switching element, and connects the battery and the adjusting condenser to the capacitor via the switching element.

According to an aspect of the present invention, a power supply circuit is provided, which is connected to a battery having an overcurrent protective device, the power supply circuit including a first capacitor which can be connected in parallel to the battery; a second capacitor which can be connected in parallel to the first capacitor; and a charge control device which controls a charging operation for charging the first capacitor and a charging operation for charging the second capacitors. The charge control device repeats a main charging operation and a relay charging operation alternately. The first capacitor is connected to the battery with the first capacitor being disconnected from the second capacitor, in order to charge the first capacitor with the battery in the main charging operation. The first capacitor is connected to the second capacitor with the first capacitor being disconnected from the battery, in order to charge the second capacitor with power output from the first capacitor.

In an embodiment, the second capacitor includes a plurality of capacitors connected in parallel.

In an embodiment, the power supply circuit further includes a switching device provided between the battery and the first capacitor. In the main charging operation, the charge control device controls a switching operation of the switching device to intermittently charge the first capacitor.

In an embodiment, the charge control device repeats the main charging operation and the relay charging operation alternately until a terminal voltage across the first capacitor becomes equal to or greater than a predetermined reference voltage at which an output current of the battery can be prevented from being interrupted by the overcurrent protective device.

In an embodiment, the charge control device performs the main charging operation when the terminal voltage across the first capacitor is smaller than a predetermined threshold voltage, and performs the relay charging operation when the terminal voltage across the first capacitor is one of equal to and greater than the predetermined threshold voltage.

In an embodiment, the charge control device supplies power output from the battery and the first capacitor to a load while performing the main charging operation, and the charge control device supplies power output only from the battery to the load while performing the relay charging operation.

In the case where the terminal voltage across the first capacitor is equal to or greater than a predetermined reference voltage at which an output current of the battery can be prevented from being interrupted by the overcurrent protective device, in a state where the second capacitor is connected in parallel to the first capacitor, the charge control device connects the battery to the first or second capacitor to supply power output from the battery and the respective first or second capacitor to the load.

Preferably, the capacitor is an electric double layer capacitor.

Preferably, the battery is a rechargeable lithium-ion battery.

In an embodiment, the restricting device includes a microcomputer including a voltage detector, a memory and a comparator.

In an embodiment, the variable resistor includes a plurality of resistors and a corresponding group of switches for switching ON/OFF states of the plurality of resistors.

In an embodiment, the controller controls the resistance value of the variable resistor from a high resistance value to a low resistance value as the terminal voltage detected by the voltage detector increases.

The present disclosure relates to subject matter contained in Japanese Patent Applications No.2000-109125 (filed on Apr. 11, 2000), No.2000-113509 (filed on Apr. 14, 2000), No.2000-113710 (filed on Apr. 14, 2000) and No.2000-143002 (filed on May 16, 2000) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

A Power supply circuit 1 to which the present invention is applied serves as an electric power supply for supplying electric power to a load 3. The power supply circuit 1 is disposed between a battery 2 provided with an overcurrent protective circuit (overcurrent protective device) 2a and the load 3. Electric current I output from the battery 2 is converted into a driving current IL to be supplied to the load 3. The overcurrent protective circuit 2a interrupts the electric current output from the battery 2 to the power supply circuit 1 when a large (heavy) electric current over a predetermined level is drawn from the battery 2. A rechargeable lithium-ion battery is known in the art as an example of such a battery provided with the overcurrent protective circuit 2a.

Figure 1:
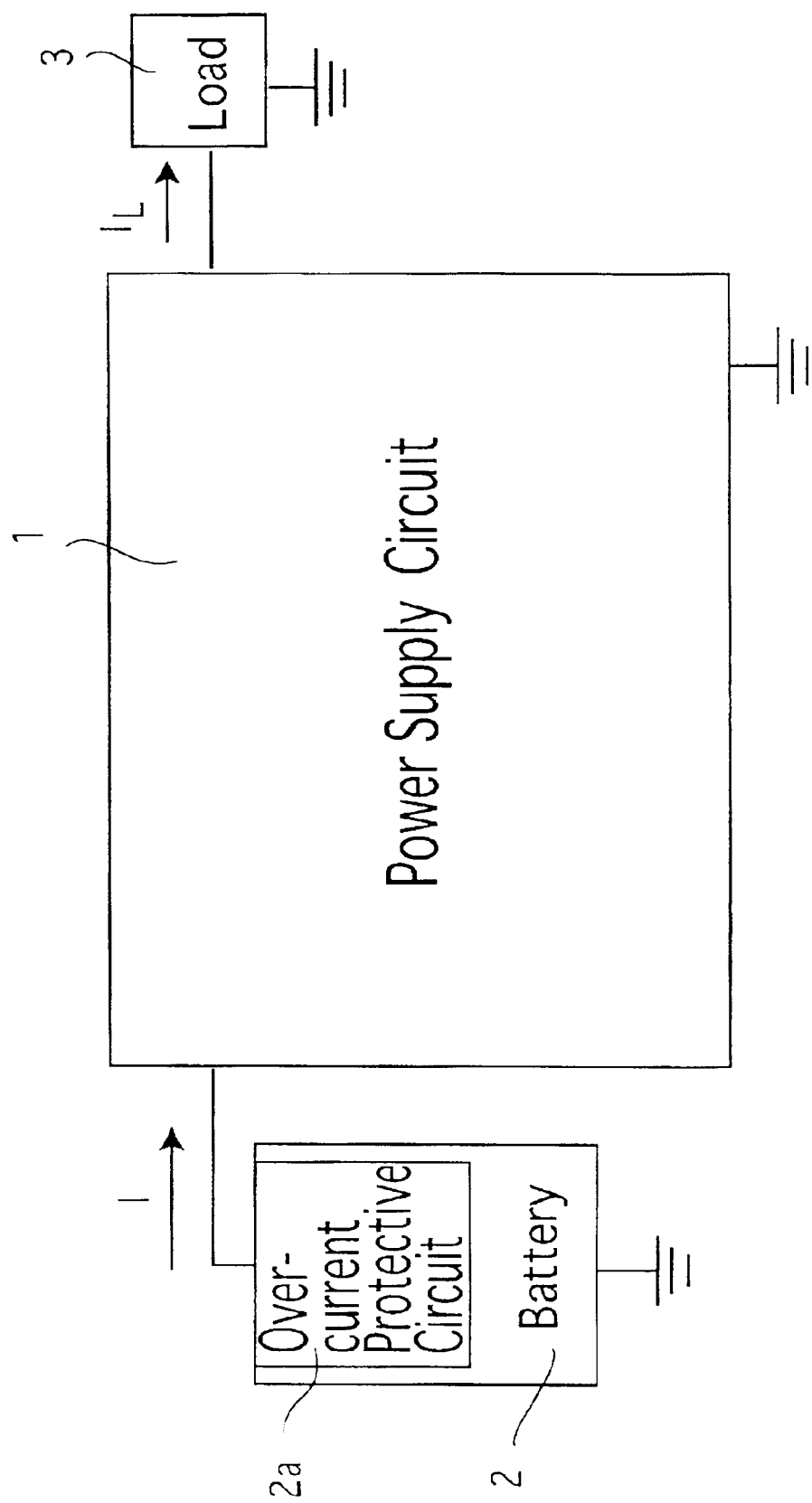
FIG. 1 is a block diagram of the basic configuration of a power supply circuit to which the present invention is applied.
Figure 2:
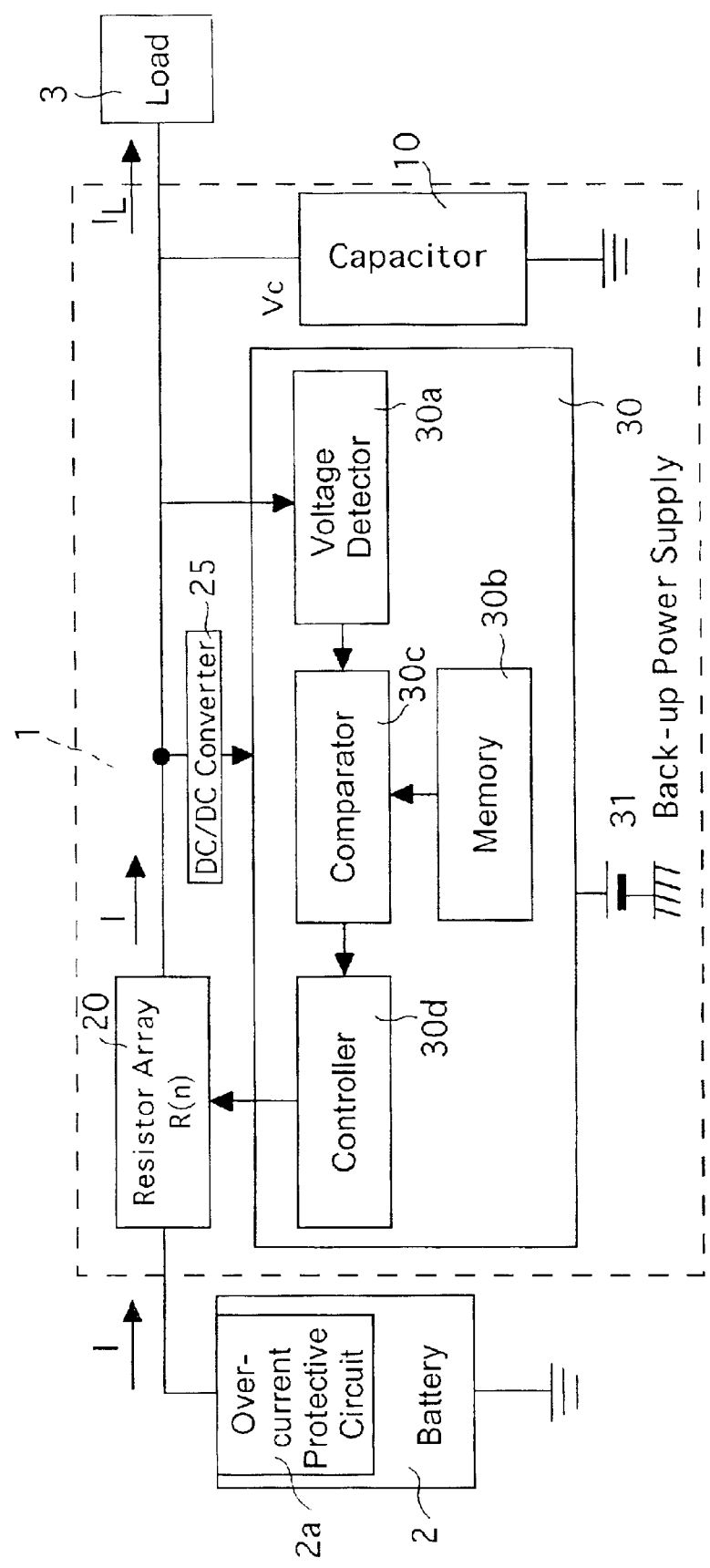
FIG. 2 is a block diagram of the first embodiment of the power supply circuit to which the present invention is applied.

FIG. 2 shows a block diagram of the first embodiment of the power supply circuit 1 to which the present invention is applied. The power supply circuit 1 is provided with a capacitor 10, a resistor array 20, a DC-DC converter 25, a microcomputer (restricting device/charge control device) 30 and a backup power supply 31. The capacitor 10 is connected in parallel to the battery 2 to function as an auxiliary power supply. An electric double layer capacitor is used as the capacitor 10. The resistor array 20 is a variable resistor provided with a plurality of resistors R(n) and a corresponding group of switches SW(n) for switching ON/OFF states of the plurality of resistors, wherein the number of the resistors R(n) is determined as a constant k. The constant k is equal to or greater than a variable n. The variable n is a natural number.

Each of the plurality of resistors R(n) is positioned between the battery 2 and the capacitor 10 to restrict the output current of the battery 2. When the battery 2 is connected to the power supply circuit 1, the DC-DC converter 25 inputs the output of the battery 2 via the resistor array 20 to convert the output voltage of the battery 2 into a predetermined voltage to supply the same to the microcomputer 30. The backup power supply 31 supplies power to the microcomputer 30 when the battery 2 is disconnected from the power supply circuit 1.

The microcomputer 30 is provided with a voltage detector 30a, a memory 30b, a comparator 30c and a controller 30d. The microcomputer 30 operates with power supplied from the DC-DC converter 25 or the backup power supply 31.

The voltage detector 30a detects the terminal voltage Vc across the capacitor 10. The memory 30b stores control data such as a threshold value V(n). The threshold value V(n) is determined in advance, in accordance with each of the plurality of resistors R(n) of the resistor array 20, as a reference voltage to determine whether it is necessary to change a currently-used resistor to another resistor in the plurality of resistors R(n) of the resistor array 20. The comparator 30c reads out the threshold value V(n) stored in the memory 30b, and compares the threshold value V(n) with the terminal voltage Vc detected by the voltage detector 30a, while the controller 30d changes the On/OFF state of each of the group of switches SW(n) of the resistor array 20 in accordance with the result of comparison by the comparator 30c.

Each time the terminal voltage Vc across the capacitor 10 becomes greater than the threshold value V(n), the microcomputer 30 changes the ON/OFF state of the group of switches SW(n) of the resistor array 20 so that the value of resistance of the resistor array 20 decreases to thereby charge the capacitor 10 while increasing the output current of the battery 2 in a stepwise manner without causing the activation of the overcurrent protective circuit 2a.

Figure 3:
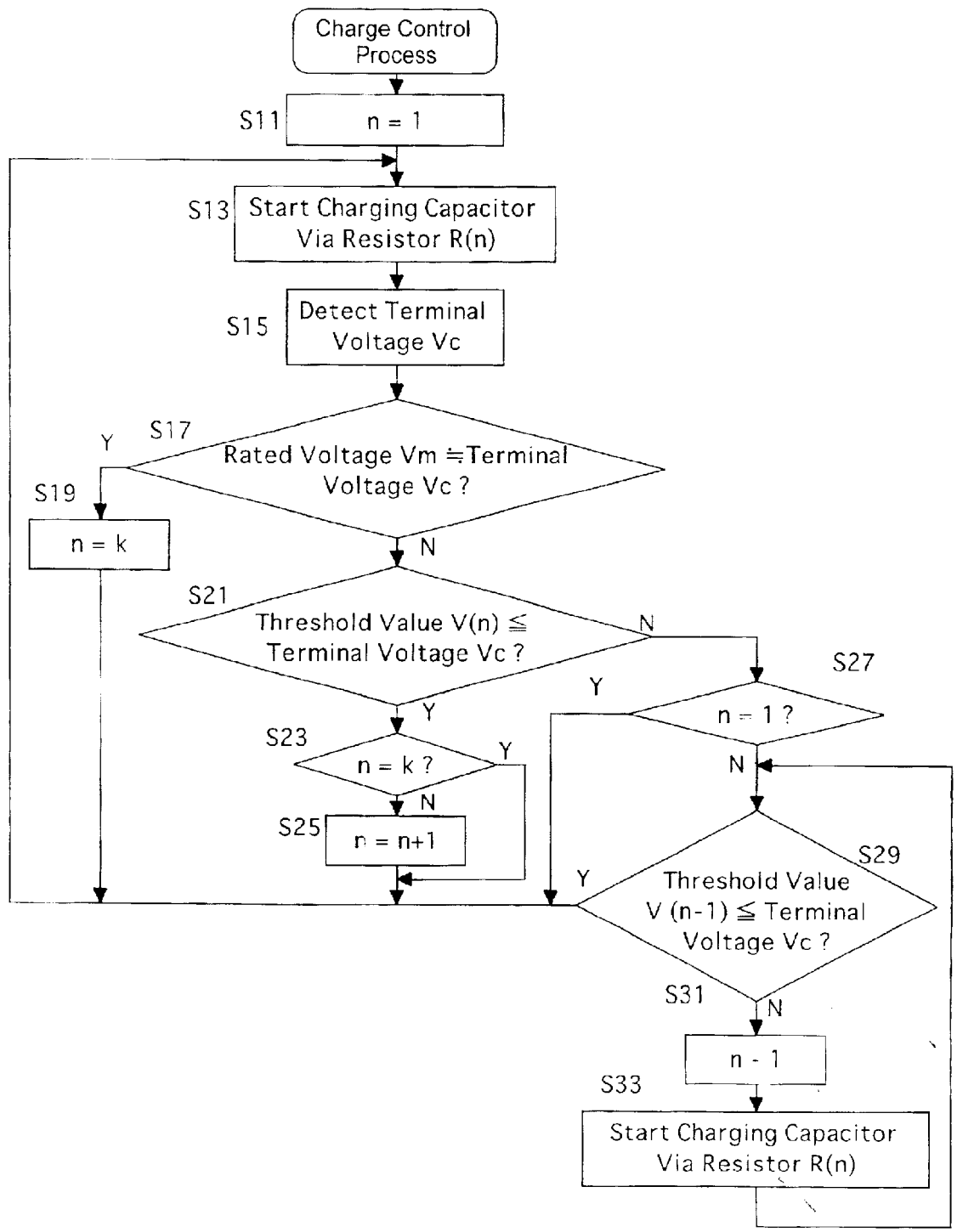
FIG. 3 is a flow chart of a charge control process for the first embodiment of the power supply circuit shown in FIG. 2.

An embodiment of a charge control process for charging the capacitor 10 will be hereinafter discussed in detail with reference to the flow chart shown in FIG. 3. The microcomputer 30 performs the charge control process each time the battery 2 is connected to the power supply circuit 1.

In the charge control process, firstly the variable n which identifies each element (resistor or switch) of the resistor array 20 or each threshold value is set to 1 (step S11). The value of resistance of the resistor R(n) is smaller as the variable n is greater. Subsequently, the switch SW(n) which corresponds to the resistor R(n) is switched ON to start charging the capacitor 10 via the resistor R(n) (step S13). Subsequently, the terminal voltage Vc across the capacitor 10 is detected (step S15), and a rated voltage Vm of the capacitor 10 is read out from the memory 30b to determine whether the detected terminal voltage Vc is nearly equal to the rated voltage Vm (step S17). If it is determined that the detected terminal voltage Vc is nearly equal to the rated voltage Vm (if "YES" at step S17), this means that the capacitor 10 has been fully charged, so that the variable n is set to the aforementioned constant k (step S19), and control returns to step S13. The constant k is the highest number of the variable n and is stored in the memory 30b in advance. In a state where the capacitor 10 has been fully charged, the battery 2 is connected to the capacitor 10 via the resistor R(k) whose value of resistance is the smallest among the plurality of resistors R(n).

If it is determined that the detected terminal voltage Vc is not nearly equal to the rated voltage Vm (if "NO" at step S17), the threshold value V(n) is read out from the memory 30b to determine whether the detected terminal voltage Vc is equal to or greater than the threshold value V(n) (step S21). As mentioned above, the threshold value V(n) is determined in advance, in accordance with each of the plurality of resistors R(n) of the resistor array 20, as a reference voltage to determine whether it is necessary to change a currently-used resistor to another resistor in the plurality of resistors R(n) of the resistor array 20. The threshold value V(n) is determined to be a greater value as the variable n is greater. If it is determined that the detected terminal voltage Vc is equal to or greater than the threshold value V(n) of the capacitor 10 (if "YES" at step S21), it is subsequently determined whether the variable n is equal to the constant k (step S23).

If it is determined that the variable n is not equal to the constant k (if "NO" at step S23), the variable n is increased by 1 (step S25), and control returns to step S13. After control returns to step S13, the capacitor 10 is charged via the resistor R(n) whose value of resistance is smaller by one step than that of the previous resistor R(n). With the above described charge control process, the output current of the battery 2 is controlled in accordance with the terminal voltage Vc across the capacitor 10.

If it is determined that the variable n is equal to the constant k (if "YES" at step S23), the operations from step S13 to step S25 are repeated until the terminal voltage Vc across the capacitor 10 becomes nearly equal to the rated voltage Vm of the capacitor 10 without changing the current resistor R(n), since the battery 2 is connected to the capacitor 10 via the resistor R(k), whose value of resistance is the smallest among the plurality of resistors R(n).

If it is determined that the detected terminal voltage Vc is not equal to or greater than the threshold value V(n) (if "NO" at step S21), it is determined whether the variable n is 1 (step S27). If it is determined that the variable n is 1 (if "YES" at step S27), this means that the battery 2 is connected to the capacitor 10 via the resistor R(1), whose value of resistance is the greatest among the plurality of resistors R(n). Thereafter, control returns to step S13, and the capacitor 10 continues to be charged without changing the current resistor R(1) until the terminal voltage Vc across the capacitor 10 becomes nearly equal to the threshold value V(1).

If it is determined that the variable n is not 1 (if "NO" at step S27), the threshold value V(n) is read out from the memory 30b to determine whether the detected terminal voltage Vc is equal to or greater than the threshold value V(n−1) (step S29). If the detected terminal voltage Vc is equal to or greater than the threshold value V(n−1) (if "YES" at step S29), control returns to step S13, and the capacitor 10 continues to be charged without changing the current resistor R(n). If the detected terminal voltage Vc is not equal to or greater than the threshold value V(n−1) (if "NO" at step S29), the variable n is decreased by 1 (step S31), and the capacitor 10 is charged via the resistor R(n) whose value of resistance is greater by one step than that of the previous resistor R(n) (step S33). Subsequently control returns to step S29. Due to the operations from step S27 to step S33, the output current of the battery 2 is controlled in accordance with the terminal voltage Vc across the capacitor 10 when the terminal voltage Vc across the capacitor 10 drops due to the discharge thereof after the capacitor 10 is fully charged once, or when the terminal voltage Vc across the capacitor 10 has not yet reached the corresponding threshold value while the capacitor is being charged. Thereafter, the operations from step S13 to step S33 are repeated as long as the battery 2 remains connected to the power supply circuit 1 or the terminal voltage Vc across the battery 2 is equal to or greater than a predetermined voltage.

As can be understood from the above description, since the microcomputer 30 charges the capacitor 10 while restricting the output current of the battery 2, the output current of the battery 2 is not interrupted by the overcurrent protective circuit 2a while the capacitor 10 is being charged. Therefore, the operator does not determine mistakenly that the battery is empty or that the electronic device to which the power supply circuit is connected is broken down.

The microcomputer 30 changes the resistor R(n) in accordance with the terminal voltage Vc across the capacitor 10, and charges the capacitor 10 while increasing the output current of the battery 2 in a stepwise manner as the terminal voltage Vc increases, which makes it possible to reduce the time necessary for charging the capacitor 10. Furthermore, in the case where the terminal voltage Vc across the capacitor 10 becomes nearly equal to the rated voltage Vm of the capacitor 10, the battery 2 is connected to the load 3 via the resistor R(k), whose value of resistance is the smallest among the plurality of resistors R(n). This makes it possible to drive the load 3 with the driving current IL that is output from the battery 2 and the capacitor 10 with minimal losses due to the resistor R(n). If the output current of the battery 2 is controlled to be maximum within a range in which the overcurrent protective circuit 2a is not actuated, the charging operation for the capacitor 10 is completed in a shorter time.

In the above described first embodiment of the power supply circuit, although the charging operation for charging the capacitor 10 is controlled by software within the microcomputer 30, the charging operation can be controlled by hardware via a charging controller for charging the capacitor 10 which is constructed of electronic parts such as a voltage detector and a field effect transistor (FET).

Figure 4:
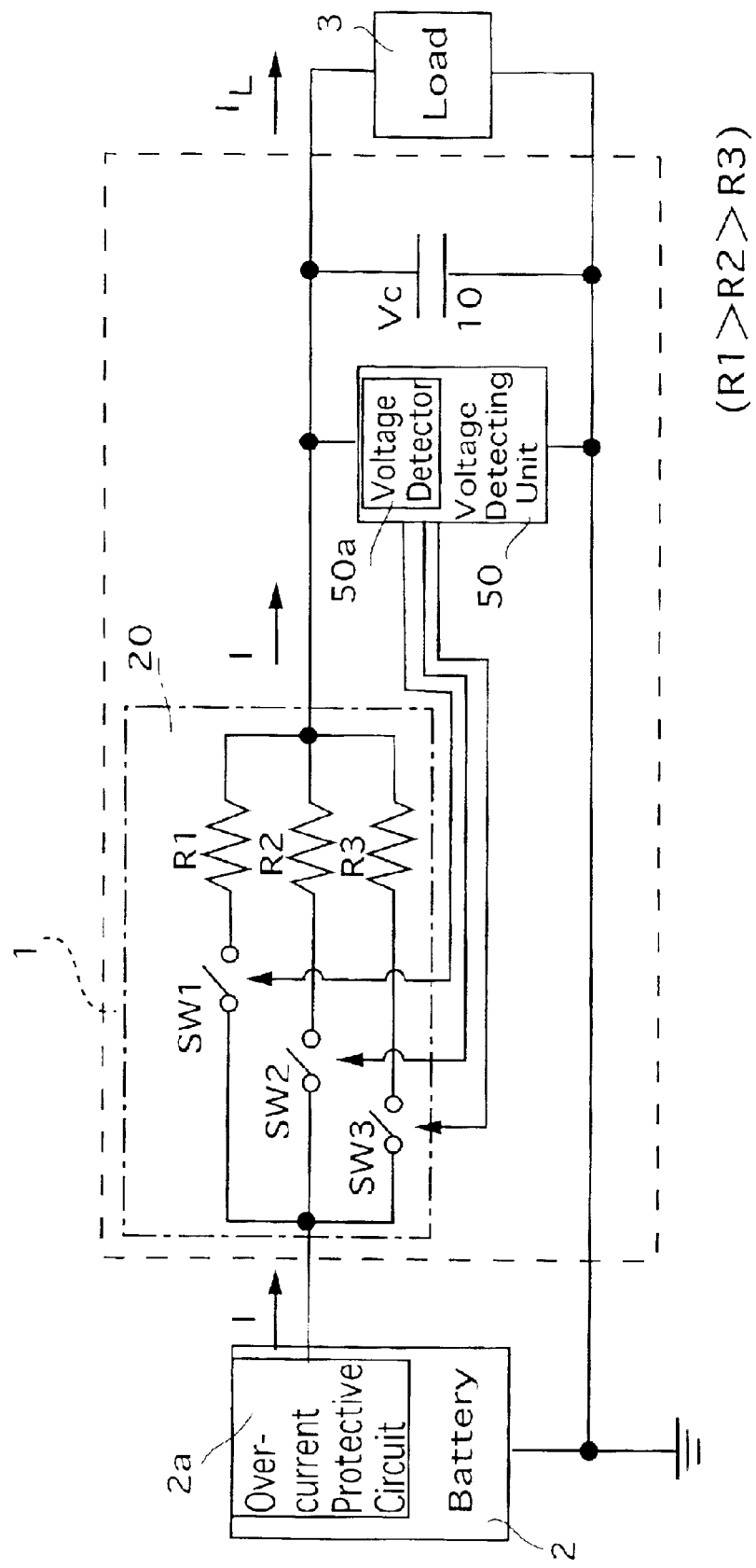
FIG. 4 is a block diagram of the second embodiment of the power supply circuit to which the present invention is applied.

FIG. 4 is a circuit diagram of the second embodiment of the power supply circuit to which the present invention is applied. The second embodiment of the power supply circuit is similar to the first embodiment shown in FIG. 2, and is constructed with more specific elements than the first embodiment of the power supply circuit. In the second embodiment of the power supply circuit, a voltage detecting unit (restricting device/charge control device/controller) 50 is adopted as a charge control device, while the resistor array 20 includes three resistors R1, R2 and R3 and corresponding three switches SW1, SW2 and SW3. Elements of the second embodiment shown in FIG. 4 which substantially function in the same manner as those of the first embodiment shown in FIG. 2 are designated by the same reference numerals.

The voltage detecting unit 50 is a general-purpose voltage detecting unit provided with a voltage detector 50a and three output ports. The voltage detecting unit 50 changes the power levels of the three outputs ports to turn ON and OFF the three switches SW1, SW2 and SW3, respectively, each time the terminal voltage Vc of the capacitor 10 exceeds a predetermined threshold value. More specifically, the first switch SW1 is turned ON when the terminal voltage Vc is smaller than the first threshold value, thereafter the first and second switches SW1 and SW2 are respectively turned OFF and ON when the terminal voltage Vc increases and eventually exceeds the first threshold value, and thereafter the second and third switches SW2 and SW3 are respectively turned OFF and ON when the terminal voltage Vc exceeds the second threshold value which is greater than the first threshold value. In this case the values of resistance of the first, second and third resistors R1, R2 and R3 are represented by the following formula:

$$R1 > R2 > R3$$

Only the first switch SW1 is ON at its default, while the second and third switches SW2 and SW3 are OFF at their defaults. Alternatively, the first, second and third switches SW1, SW2 and SW3 can be turned ON in turn as the charge voltage increases, or the first, second and third switches SW1, SW2 and SW3 can be turned ON in predetermined order so that the combined resistance of the first, second and third resistors R1, R2 and R3 connected in parallel reduces in a stepwise manner. The value of resistance of each of the resistors R1, R2 and R3 is not limited solely to the value of resistance of the above described particular embodiment, all the values of resistance of the resistors R1, R2 and R3 can be the same. Moreover, the number of resistors provided in the resistor array 20 is not limited solely to three, but can be any other number. Likewise, the number of switches provided in the resistor array 20 is not limited solely to three, but can be any other number.

Immediately after the battery 2 is connected to the power supply circuit 1, firstly the capacitor 10 is charged via the first resistor R1, the value of resistance of which is the highest, so that the terminal voltage Vc across the capacitor 10 increases. Thereafter, upon the terminal voltage Vc exceeding the first threshold value, only the second switch SW2 is turned ON by the voltage detecting unit 50 to charge the capacitor 10 via the second resistor R2, the value of resistance being smaller than that of the first resistor R1. Thereafter, upon the terminal voltage Vc exceeding the second threshold value, only the third switch SW3 is turned ON by the voltage detecting unit 50 to charge the capacitor 10 via the third resistor R3, the value of resistance being smaller than that of each of the first and second resistors R1 and R2.

As can be understood from the above description, since the value of resistance of the resistor array 20 is reduced as the terminal voltage Vc across the capacitor 10 increases, the output current of the battery 2 is not interrupted by the overcurrent protective circuit 2a while the capacitor 10 is being charged, and the recharge time can also be shortened.

Figure 8:
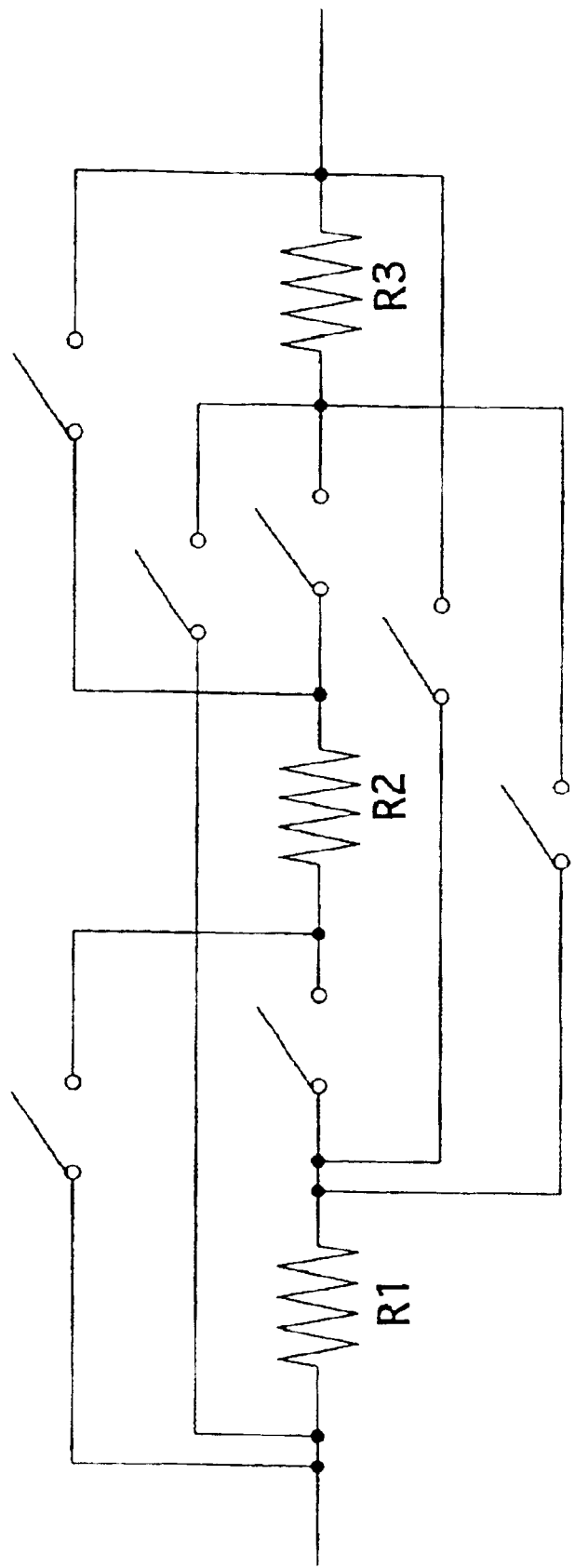
FIG. 8 is a schematic diagram of another embodiment of the switching device provided in the second embodiment of the power supply circuit shown in FIG. 4.

In the second embodiment of the power supply circuit, although the battery 2 is connected to the capacitor 10 via one of the three resistors R1, R2 and R3, the battery 2 can be connected to the capacitor 10 via firstly the first resistor R1, subsequently the first and second resistors R1 and R2 in parallel, and eventually the first, second and third resistors R1, R2 and R3 in parallel. Alternatively, the resistor array 20 can be modified, as shown in FIG. 8, so that the battery 2 is connected to the capacitor 10 via only one of the three resistors R1, R2 and R3, or any two or all of the three resistors R1, R2 and R3 in series.

The number of resistors provided in the resistor array 20 can be any number but is preferably determined with consideration given to the characteristic of the battery used and the current usage pattern of the battery. However, if the number of resistors provided in the resistor array 20 is great, the cost of production of the power supply circuit and the size of the circuit thereof increase, and a complicated control is required. Accordingly, the number of resistors provided in the resistor array 20 is preferably two to nine. It is preferable that the resistor array 20 provides about three stages in the variation in the value of resistance of the resistor array 20. A stepless variable resistor can be used as the resistor array 20. A load-break switch or a digital transistor can be used for each of the three switches SW1, SW2 and SW3.

Figure 5:
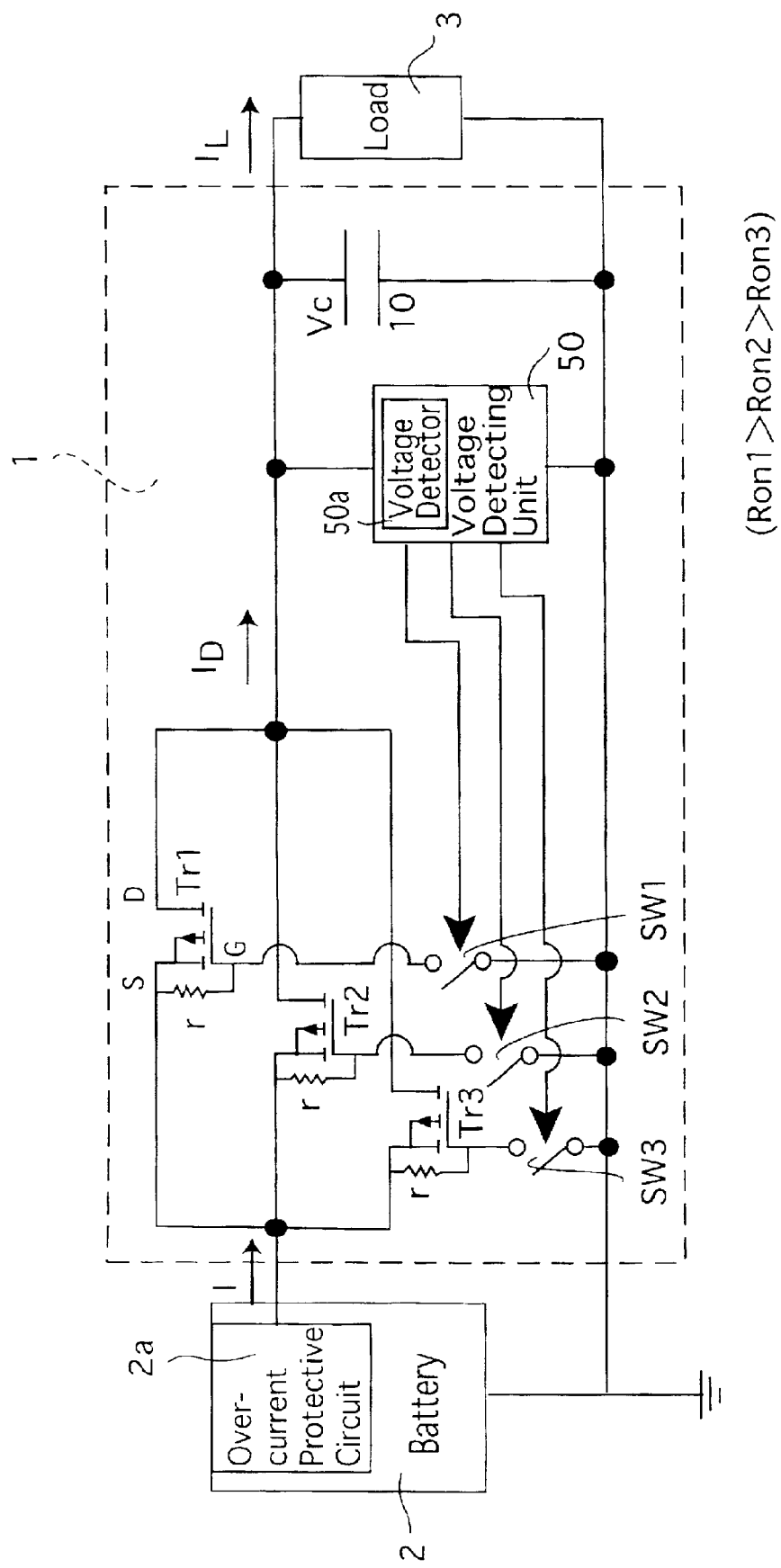
FIG. 5 is a block diagram of the third embodiment of the power supply circuit to which the present invention is applied.

FIG. 5 is a circuit diagram of the third embodiment of the power supply circuit to which the present invention is applied. The third embodiment of the power supply circuit is provided with three transistors Tr1, Tr2 and Tr3 instead of the three resistors R1, R2 and R3 (see FIG. 4) used in the second embodiment. The output current of the battery 2 is controlled by three resistances Ron1, Ron2 and Ron3 of the three transistors Tr1, Tr2 and Tr3 when associated three switches SW1, SW2 and SW3 are ON, respectively. The values of resistances Ron1, Ron2 and Ron3 are represented by the following formula:

$$Ron1 > Ron2 > Ron3$$

Elements of the third embodiment shown in FIG. 5 which substantially function in the same manner as those of the first embodiment shown in FIG. 2 are designated by the same reference numerals.

Figure 7:
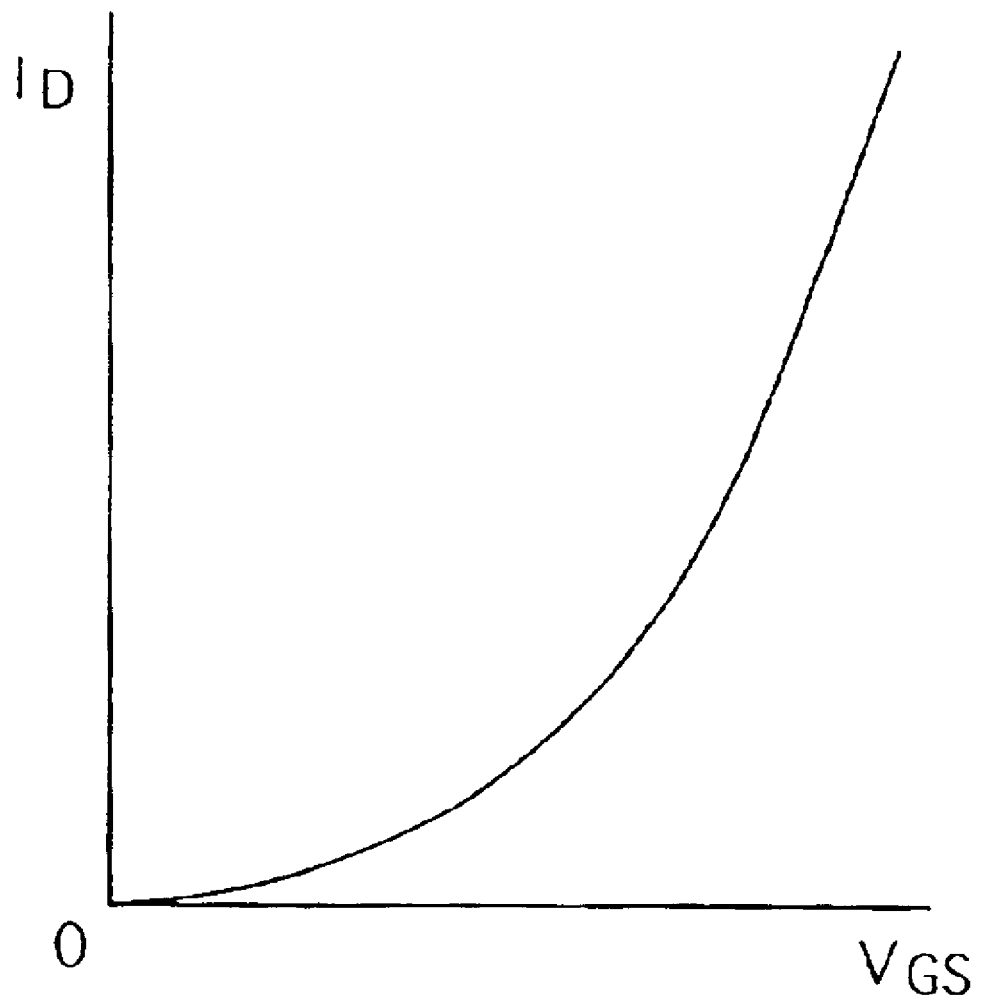
FIG. 7 is a graph showing a static characteristic curve of an enhancement MOSFET (metal oxide semiconductor field-effect transistor)

An enhancement MOSFET is used as each of the transistors Tr1, Tr2 and Tr3. FIG. 7 shows a static characteristic curve of the enhancement MOSFET. In FIG. 7, the horizontal axis represents the voltage VGS applied across the gate and the source of the enhancement MOSFET, while the vertical axis represents the drain current ID which flows between the source and the drain of the enhancement MOSFET.

The source of each of the first, second and third transistors Tr1, Tr2 and Tr3 is connected to the battery 2, while the drain of each of the first, second and third transistors Tr1, Tr2 and Tr3 is connected to the voltage detecting unit 50, the capacitor 10 and the load 3. The gate of each of the first, second and third transistors Tr1, Tr2 and Tr3 is connected to one terminal of the corresponding first, second or third switch SW1, SW2 or SW3. The other terminal of each of the first, second and third switches SW1, SW2 and SW3 is grounded. In a state where one of the switches SW1, SW2 and SW3 is OFF, the drain current ID does not flow between the source and the drain of the corresponding transistor Tr1, Tr2 or Tr3 since the gate and the source thereof are maintained at the same potential (see FIG. 7). On the other hand, in a state where one of the switches SW1, SW2 and SW3 is ON, a potential difference occurs across the gate and the source of the corresponding transistor Tr1, Tr2 or Tr3, to thereby cause the drain current ID to flow between the source and the drain thereof since the gate of the corresponding transistor Tr1, Tr2 or Tr3 is connected to ground. Only the first switch SW1 is ON at its default, while the second and third switches SW2 and SW3 are OFF at their defaults.

Immediately after the battery 2 is connected to the power supply circuit 1, firstly the capacitor 10 is charged via the first transistor Tr1, the value of resistance thereof being the highest when the first switch SW1 is ON. The voltage detecting unit 50 detects the terminal voltage Vc across the capacitor 10, and switches the ON/OFF state of the switches SW1, SW2 and SW3 every time the terminal voltage Vc exceeds a predetermined threshold value to charge the capacitor 10 while increasing the output current of the battery 2 in a stepwise manner. More specifically, upon the terminal voltage Vc exceeding the first threshold value, only the second switch SW2 is turned ON by the voltage detecting unit 50 to charge the capacitor 10 via the second transistor Tr2, the value of resistance thereof being smaller than that of the first transistor Tr1 when the second switch SW2 is ON. Thereafter, upon the terminal voltage Vc exceeding the second threshold value, only the third switch SW3 is turned ON by the voltage detecting unit 50 to charge the capacitor 10 via the third transistor Tr3, the value of resistance thereof being smaller than that of each of the first and second transistors Tr1 and Tr2 when the third switch SW3 is ON. Therefore, the output current of the battery 2 is not interrupted by the overcurrent protective circuit 2a while the capacitor 10 is being charged.

In the third embodiment of the power supply circuit, although only one of the first, second and third transistors Tr1, Tr2 and Tr3 is turned ON at a time, more than one of the first, second and third transistors Tr1, Tr2 and Tr3 can be turned ON at a time. Moreover, a switching device can be provided which makes it possible to connect the battery 2 to the capacitor 10 via only one of the three transistors Tr1, Tr2 and Tr3 or any two or all of the three transistors Tr1, Tr2 and Tr3 in series. The number of transistors provided in the resistor array 20 is not limited solely to three but can be any other number. Likewise, the number of switches provided in the resistor array 20 is not limited solely to three but can be any other number.

Figure 6:
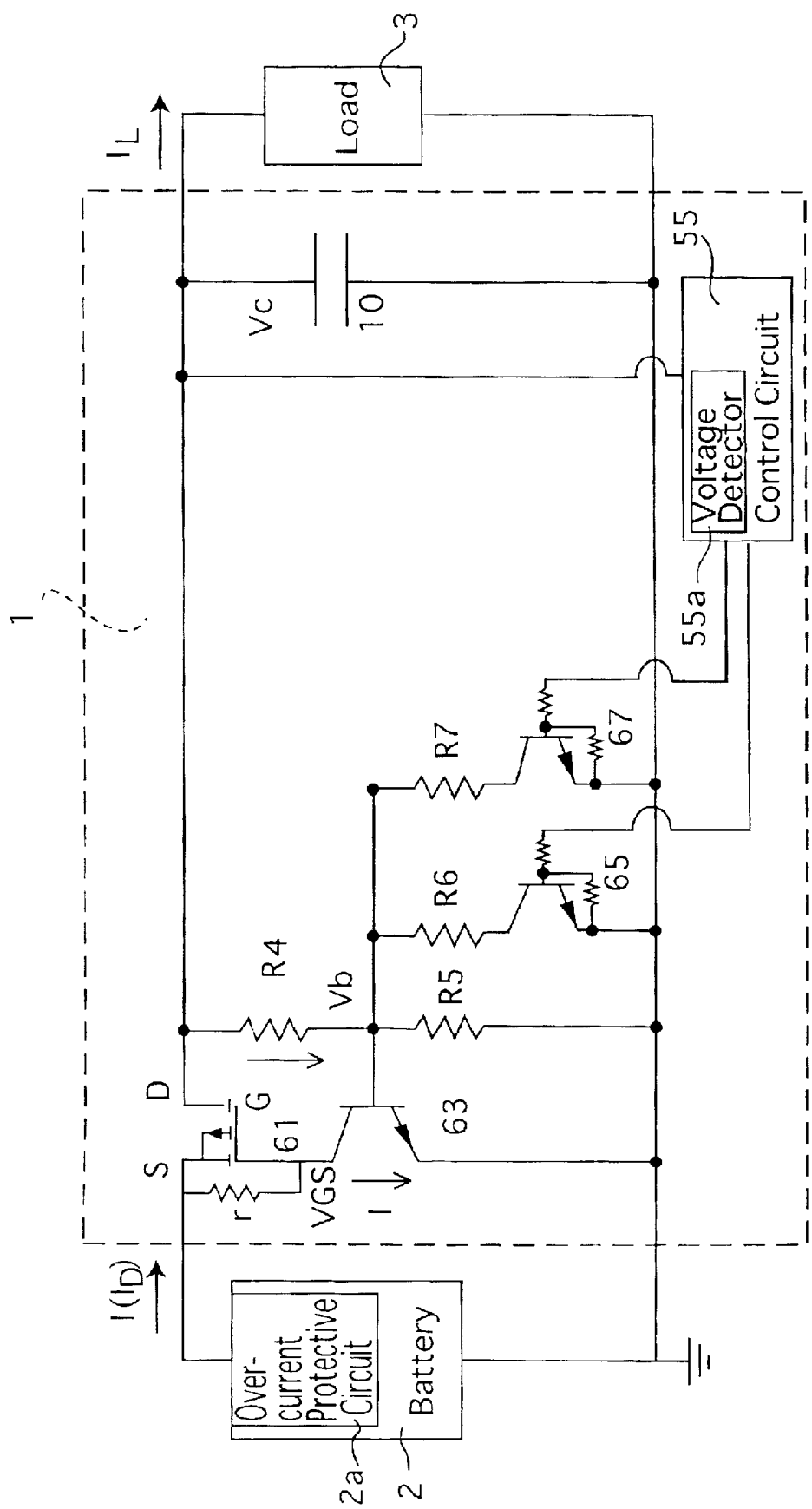
FIG. 6 is a block diagram of the fourth embodiment of the power supply circuit to which the present invention is applied.

FIG. 6 is a circuit diagram of the fourth embodiment of the power supply circuit to which the present invention is applied. The fourth embodiment of the power supply circuit 1 is provided between the battery 2 and the capacitor 10 with a MOSFET (metal oxide semiconductor FET) 61, and is further provided with a control circuit (restricting device/ charge control device/controller) 55 which serves as a charge control device. In the fourth embodiment of the power supply circuit, the output current of the battery 2 is controlled by controlling the voltage VGS applied across the gate and the source of the MOSFET 61.

The source of the MOSFET 61 is connected to the battery 2, while the drain of the MOSFET 61 is connected to the capacitor 10 and the load 3. The gate of the MOSFET 61 is connected to the collector of a transistor 63 the emitter of which is grounded. The drain of the MOSFET 61 is connected to the base of the transistor 63 via a resistor R4, while the base of the transistor 63 is connected to the ground via a resistor R5. The resistor R5 is connected in parallel to a serially-arranged circuit consisting of a resistor R6 and a transistor (an on-off switch) 65 and another serially-arranged circuit consisting of a resistor R7 and a transistor (an on-off switch) 67. The values of 29 resistance of the resistors R5, R6 and R7 are represented by the following formula;

$$R5 \geq R6 \geq R7$$

The base of each of the transistors 65 and 67 is connected to the control circuit 55 so that the ON/OFF state of each of the transistors 65 and 67 is controlled by the control circuit 55. When the transistor 65 is ON, the resistor R6 is connected in parallel to the resistor R5 via the transistor 65. If the ON/OFF state of the transistor 65 is switched to an OFF state from an ON state, the base voltage Vb increases since the resistor R6 is disconnected from the resistor R5. As the base voltage Vb increases, the gate voltage of the MOSFET 61 decreases, which causes the voltage VGS applied across the gate and the source of the enhancement MOSFET 61 to increase. As a result, the drain current ID of the enhancement MOSFET 61 increases (see FIG. 7). Likewise, if the ON/OFF state of the transistor 67 is switched to an OFF state from an ON state, the voltage VGS applied across the gate and the source of the enhancement MOSFET 61 increases, while the drain current ID of the enhancement MOSFET 61 increases.

Accordingly, the output current of the battery 2 is the smallest and the greatest when both the transistors 65 and 67 are ON and OFF, respectively.

Immediately after the battery 2 is connected to the power supply circuit 1, the drain current ID which corresponds to the voltage VGS applied across the gate and the source of the enhancement MOSFET 61 is drawn from the battery 2 to charge the capacitor 10. All the transistors 63, 65 and 67 are ON at their defaults. The control circuit 55 detects the terminal voltage Vc across the capacitor 10 via a voltage detector 55a, and turns OFF the transistors 63, 65 and 67 in turn every time the terminal voltage Vc exceeds a predetermined threshold value. If the transistor 67 is turned OFF, the base voltage Vb of the transistor 63 increases, which causes the voltage VGS applied across the gate and the source of the enhancement MOSFET 61 to increase. As a result, the output current of the battery 2 increases. Thereafter, if the transistor 65 is turned OFF, the base voltage Vb of the transistor 63 further increases, so that the output current of the battery 2 further increases.

As can be understood from the above description, in the fourth embodiment of the power supply circuit, the output current of the battery 2 is not interrupted by the overcurrent protective circuit 2a while the capacitor 10 is being charged, since the output of the battery 2 is controlled by controlling the voltage VGS applied across the gate and the source of the enhancement MOSFET 61.

The number of resistors provided between the base and the emitter of the transistor 63 is not limited solely to the particular number in the above illustrated embodiment. The resistor provided between the base and the emitter of the transistor 63 can be provided as a stepless variable resistor.

Figure 9:
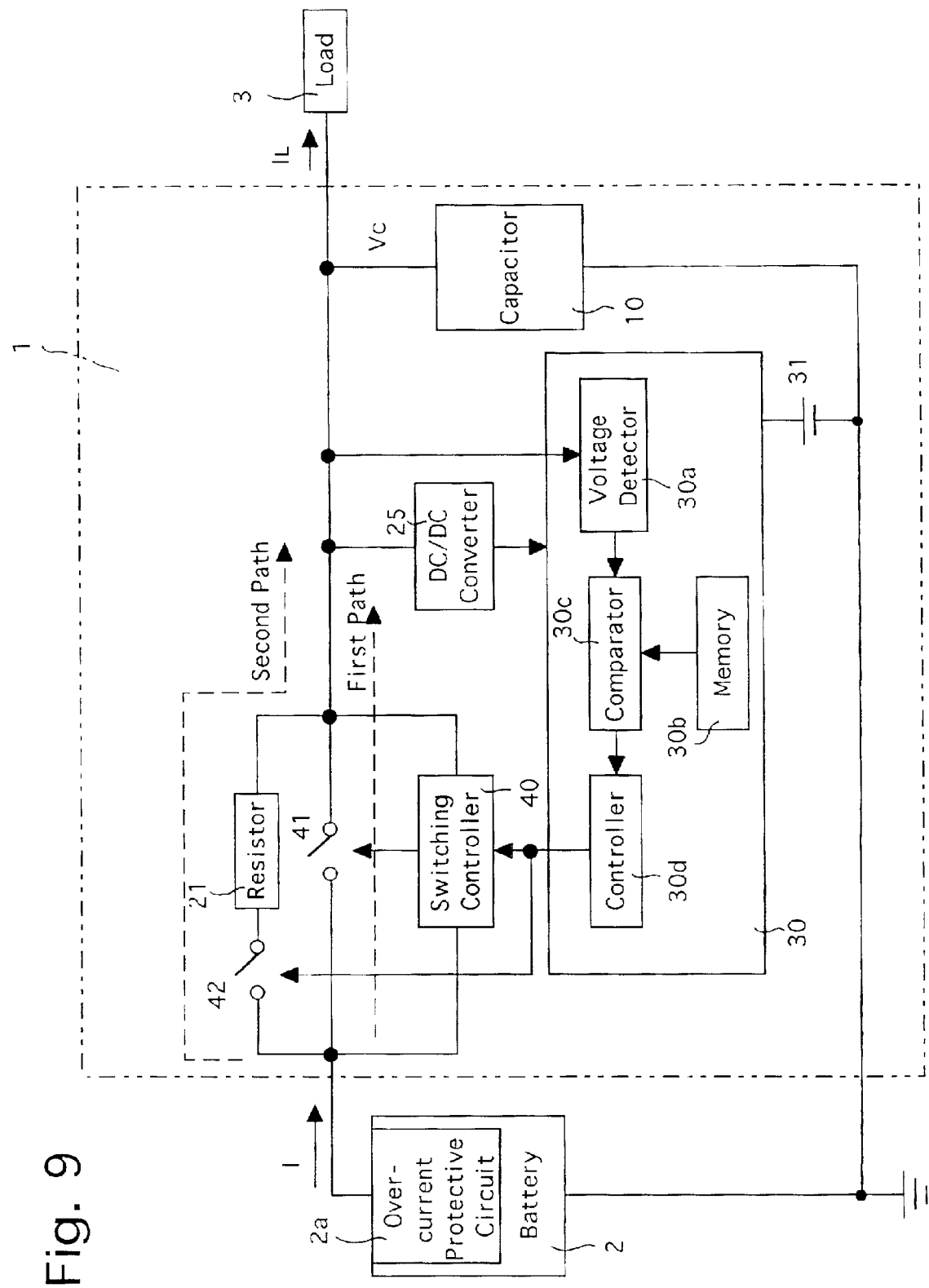
FIG. 9 is a block diagram of the fifth embodiment of the power supply circuit to which the present invention is applied.

FIG. 9 is a circuit diagram of the fifth embodiment of the power supply circuit to which the present invention is applied. In the fifth embodiment of the power supply circuit, the charging operation for charging the capacitor 10 is switched between a continuous charging operation and an intermittent charging operation in accordance with the terminal voltage Vc across the capacitor 10 via the control of the microcomputer (restricting device/charge control device) 30 that serves as a charge control device.

The fifth embodiment of the power supply circuit 1 is provided with a capacitor 10, a resistor 21, a DC-DC converter 25, a microcomputer 30, a backup power supply 31, a switching controller 40, a first switch (switching element) 41 and a second switch 42. Elements of the fifth embodiment shown in FIG. 9 which substantially function in the same manner as those of the first embodiment shown in FIG. 2 are designated by the same reference numerals.

A resistor having a low resistance value (e.g., approximately a few hundredths of an ohm) is used as the resistor 21. The first switch 41 is provided in a first path (primary path) for connecting the battery 2 with the capacitor 10. The controller 30d controls the switching operation of the first switch 41 via the switching controller 40. The second switch 42 is provided in a second path (alternative path) for connecting the battery 2 with the capacitor 10 via the resistor 21. The second switch 42 is turned ON and OFF by the controller 30d.

Figure 10:
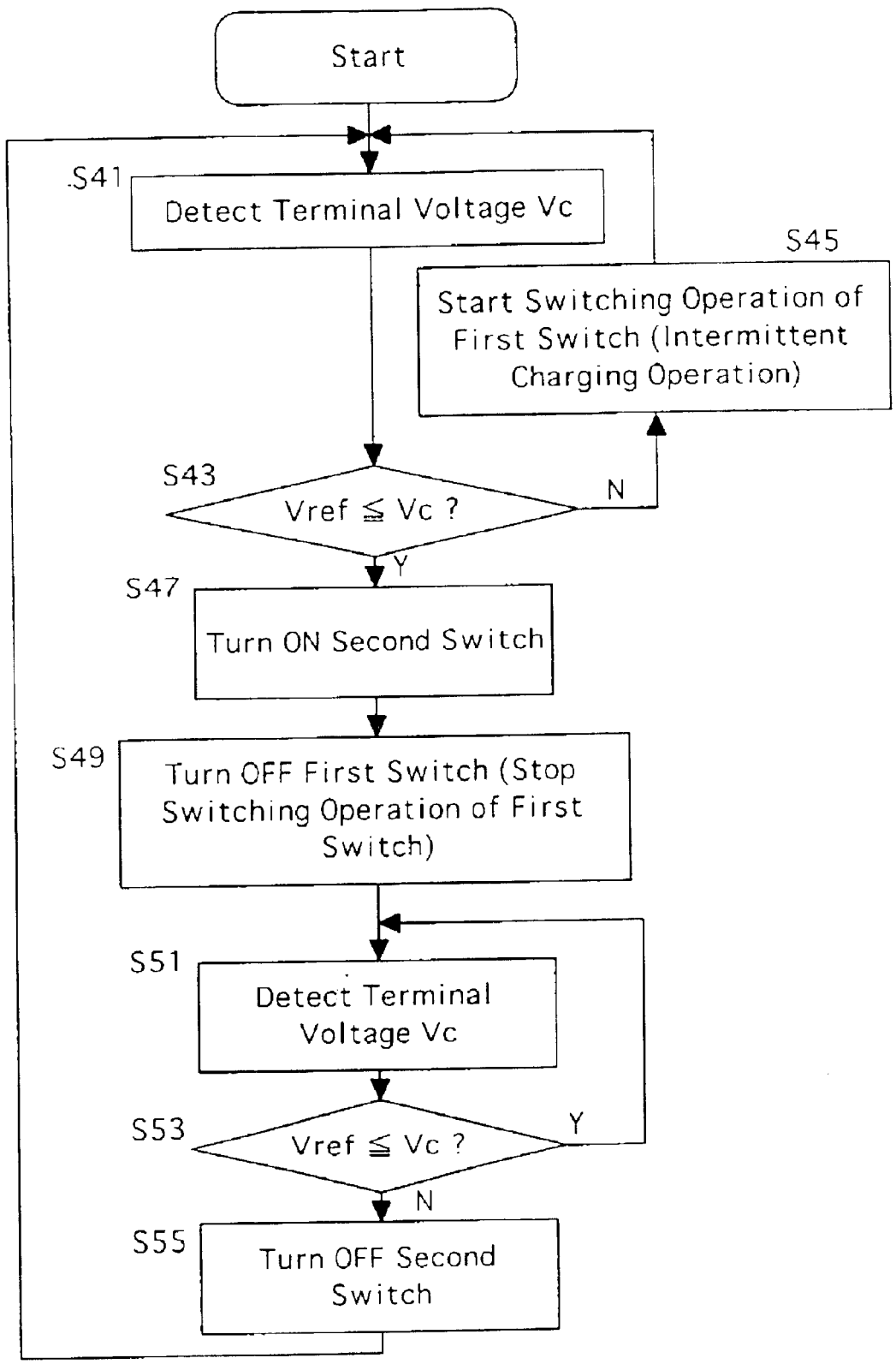
FIG. 10 is a flow chart of a charge control process for the fifth embodiment of the power supply circuit shown in FIG. 9.

A charge control process for charging the capacitor 10 in the fifth embodiment of the power supply circuit will be hereinafter discussed in detail with reference to the flow chart shown in FIG. 10. The microcomputer 30 performs the charge control process each time the battery 2 is connected to the power supply circuit 1.

In the charge control process, firstly the terminal voltage Vc across the capacitor 10 is detected (step S41), and a reference voltage Vref is read out from the memory 30b to determine whether the detected terminal voltage Vc is equal to or greater than a reference voltage Vref (step S43). The reference voltage Vref is a threshold voltage of the terminal voltage Vc at which the output current of the battery 2 does not exceed an overcurrent detection value even if the battery 2 is connected directly to the capacitor 10. The reference voltage Vref is used to determine whether the capacitor 10 needs to be charged intermittently.

If it is determined that the detected terminal voltage Vc is not equal to or greater than the reference voltage Vref (if "NO" at step S43), a switching operation of the first switch 41 is started (step S45) to continue to charge the capacitor 10 intermittently with the first path (see FIG. 9) until the detected terminal voltage Vc becomes equal to or greater than the reference voltage Vref. The switching operation switches the first switch 41 ON and OFF successively at a predetermined period (cycle).

In this connection, the duration of an ON state of the first switch 41 in the intermittent charging operation is shorter than the time necessary for the overcurrent protective circuit 2a to detect the overcurrent of the battery 2.

If it is determined that the detected terminal voltage Vc is equal to or greater than the reference voltage Vref (if "YES" at step S43), the second switch 42 is turned ON while the first switch 41 is turned OFF to stop the switching operation of the first switch 41 (steps S47 and S49). This stops the intermittent charging operation for the capacitor 10 and changes the charging path from the first path to the second path. Consequently, the current output from the battery 2 flows into the resistor 21 and the capacitor 10 bypassing the first switch 41 to thereby charge the capacitor 10 continuously, i.e., to perform the continuous charging operation for the capacitor 10.

Subsequently, the terminal voltage Vc across the capacitor 10 is detected (step S51), and it is determined whether the detected terminal voltage Vc is equal to or greater than the reference voltage Vref (step S53). If it is determined that the detected terminal voltage Vc is equal to or greater than the reference voltage Vref (if "YES" at step S53), control returns to step S51, so that the terminal voltage Vc is detected at regular time intervals. On the other hand, if it is determined that the detected terminal voltage Vc is smaller than the reference voltage Vref (if "NO" at step S53), the second switch 42 is turned OFF (step S55), and control returns to step S41. This control stops the continuous charging operation for the capacitor 10 and changes the charging path from the second path back to the first path. Thereafter, the intermittent charging operation for the capacitor 10 starts operating at step S45.

Figure 11:
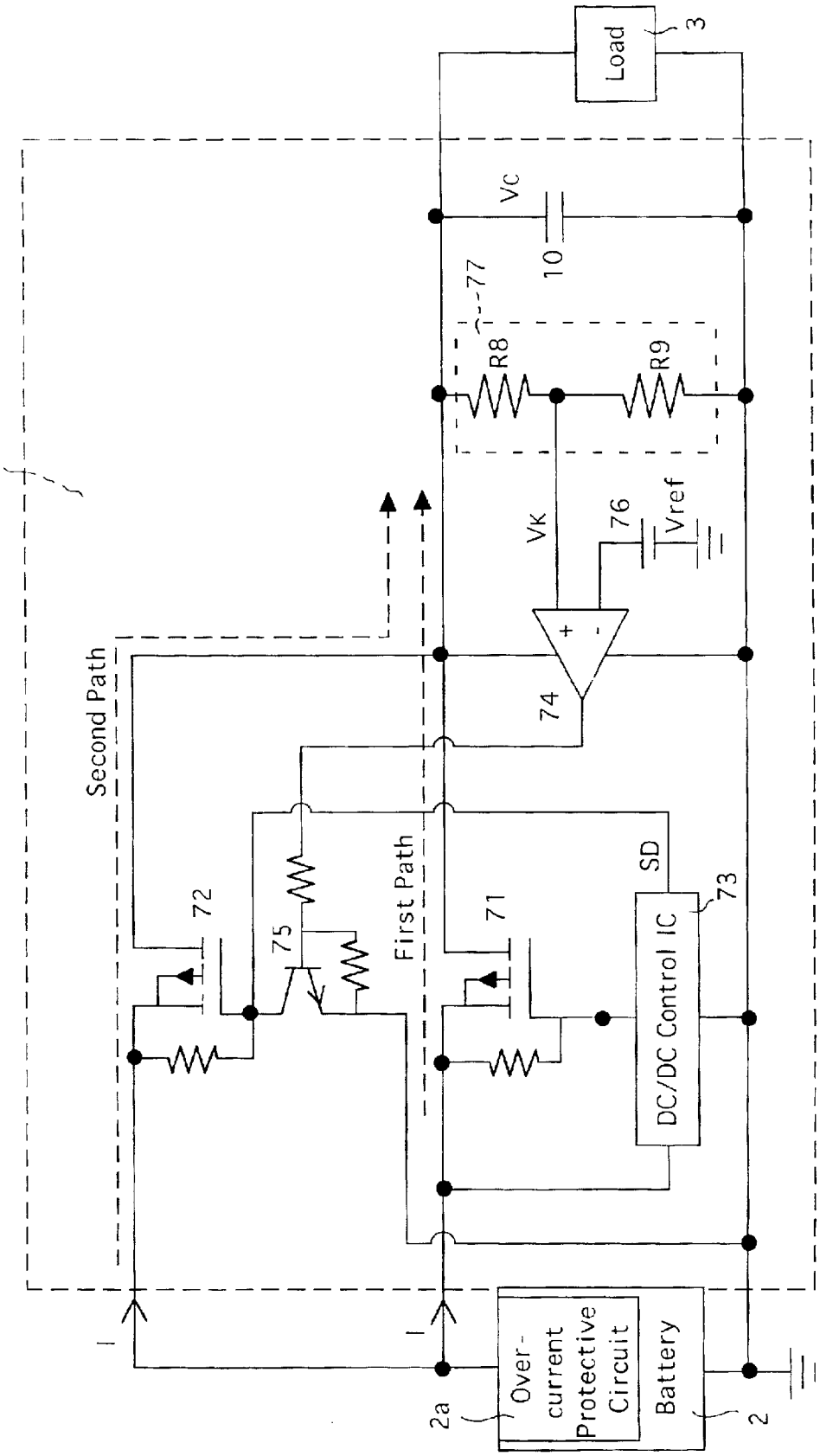
FIG. 11 is a block diagram of the sixth embodiment of the power supply circuit to which the present invention is applied.

FIG. 11 is a circuit diagram of the sixth embodiment of the power supply circuit to which the present invention is applied. The sixth embodiment of the power supply circuit is similar to the fifth embodiment shown in FIG. 9 and is constructed with more specific elements than the fifth embodiment of the power supply circuit. The fifth embodiment of the power supply circuit 1 is provided with a capacitor 10, a first MOSFET 71, a second MOSFET 72, a DC-DC control IC 73, a comparator 74, a digital transistor 75, a reference voltage source 76 and a voltage dividing circuit 77. The control IC 73 and the comparator 74 constitute a restricting device/charge control device.

The first MOSFET 71 serves as the first switch 41 shown in FIG. 9. The second MOSFET 72 serves as the second switch 42 and the resistor 21 shown in FIG. 9. The DC-DC control IC 73 serves as the switching controller 40 shown in FIG. 9. The comparator 74 and the transistor 75 together serve as a charge control device.

The power terminal of the DC-DC control IC 73 is connected to the battery 2, while the shutdown terminal SD of the DC-DC control IC 73, which turns ON and OFF the DC-DC control IC 73, is connected to the collector of the transistor 75. The DC-DC control IC 73 turns ON the first MOSFET 71 to perform a switching operation thereof when the digital transistor 75 is OFF, while the DC-DC control IC 73 turns OFF the first MOSFET 71 to stop the switching operation thereof when the digital transistor 75 is ON. In this connection, in the switching operation of the first MOSFET 71 (in the intermittent charging operation), the duration of an ON state of the first MOSFET 71 is shorter than the prescribed time necessary for the overcurrent protective circuit 2a to detect the overcurrent of the battery 2.

The reference voltage source 76 which outputs the reference voltage Vref is connected to the inverting input terminal (−) of the comparator 74, while the voltage dividing circuit 77 is connected to the non-inverting input terminal (+) of the comparator 74. The voltage dividing circuit 77 includes two resistors (bleeder resistors) R8 and R9 connected in series. The voltage dividing circuit 77 divides the terminal voltage Vc across the capacitor 10 via the two resistors R8 and R9 to output a divided voltage Vk to the non-inverting input terminal (+) of the comparator 74. The comparator 74 compares the divided voltage Vk with the reference voltage Vref.

If the divided voltage Vk is smaller than the reference voltage Vref, the comparator 74 outputs a low-level voltage to thereby turn OFF the digital transistor 75. In a state where the digital transistor 75 is OFF, the second MOSFET 72 is OFF since the source and the gate of the second MOSFET 72 are maintained at the same potential. In a state where the second MOSFET 72 is OFF, no current flows through the second path. However, the capacitor 10 is charged intermittently via the first path since the switching operation of the first MOSFET 71 starts by control via the DC-DC control IC 73.

If the divided voltage Vk is equal to or greater than the reference voltage Vref, the comparator 74 outputs a high-level voltage to thereby turn ON the digital transistor 75. In a state where the digital transistor 75 is ON, the second MOSFET 72 is ON since the gate of the second MOSFET 72 becomes the same potential as ground. In a state where the second MOSFET 72 is ON, the shutdown terminal SD of the DC-DC control IC 73 becomes the same potential as ground, which causes the switching operation of the first MOSFET 71 to stop, and holds the first MOSFET 71 in an OFF state. Consequently, no current flows through the first path, while the capacitor 10 is charged continuously via the second path.

As can be understood from the above descriptions, in each of the fifth and sixth embodiments, the output current of the battery 2 is not interrupted by the overcurrent protective circuit 2a while the capacitor 10 is being charged since the capacitor 10 is charged intermittently via the first path if the terminal voltage Vc across the capacitor 10 is smaller than a predetermined threshold value, and thereafter stops being charged intermittently to start being charged continuously via the second path if the terminal voltage Vc across the capacitor 10 becomes equal to or greater than the predetermined threshold value. Accordingly, a complicated circuit for preventing the output current of the battery 2 from being interrupted by the overcurrent protective circuit 2a while the capacitor 10 is being charged does not have to be provided.

Furthermore, in each of the fifth and sixth embodiments, since the charging operation for charging the capacitor 10 is switched between the intermittent charging operation and the continuous charging operation, the recharge time of the capacitor 10 can be made shorter than the case where the capacitor 10 is charged only intermittently. Moreover, the noise generated by the switching operation of the first switch 41 (the MOSFET 71) can be minimized more than in the case where the capacitor 10 is charged only intermittently. Furthermore, the output current of the battery 2 can be prevented from being interrupted by the overcurrent protective circuit 2a with versatility, while the capacitor 10 is being charged even if the current that the load 3 consumes varies by charging the capacitor 10 continuously.

In each of the fifth and sixth embodiments, although the duration of an ON state of the first switch 41 (the first MOSFET 71) in the intermittent charging operation is determined to be shorter than the prescribed time necessary for the overcurrent protective circuit 2a to detect the overcurrent of the battery 2, the duration is not limited solely thereto. Alternatively, the duration of an ON state of the first switch 41 (the first MOSFET 71) in the intermittent charging operation and the duration of an OFF state of the first switch 41 (the first MOSFET 71) in the intermittent charging operation can be determined appropriately so that the overcurrent protective circuit 2a is not actuated to interrupt the electric current output from the battery 2 to the power supply circuit 1. For instance, by measuring a duration t from the moment the battery 2 is connected to the capacitor 10 to the moment the output current of the battery 2 exceeds the overcurrent detection value of the overcurrent protective circuit 2a beforehand, the duration of an ON state of the first switch 41 (the first MOSFET 71) in the intermittent charging operation can be determined to be shorter than the duration t. The duration t does not have to be constant since the current output from the battery 2 varies in accordance with the terminal voltage Vc across the capacitor 10. For instance, the duration t can be determined so that the duration of an ON state of the first switch 41 (the first MOSFET 71) in the intermittent charging operation becomes longer as the recharge time elapses or as the terminal voltage Vc across the capacitor 10 increases.

In the sixth embodiment of the power supply circuit, the resistance of the second MOSFET 72 when it is ON corresponds to the resistor 21 shown in FIG. 9 since the second MOSFET 72 is provided as the second switch 42 shown in FIG. 9. However, the resistance value of the resistor 21 can be zero ohm (0Ω).

Figure 12:
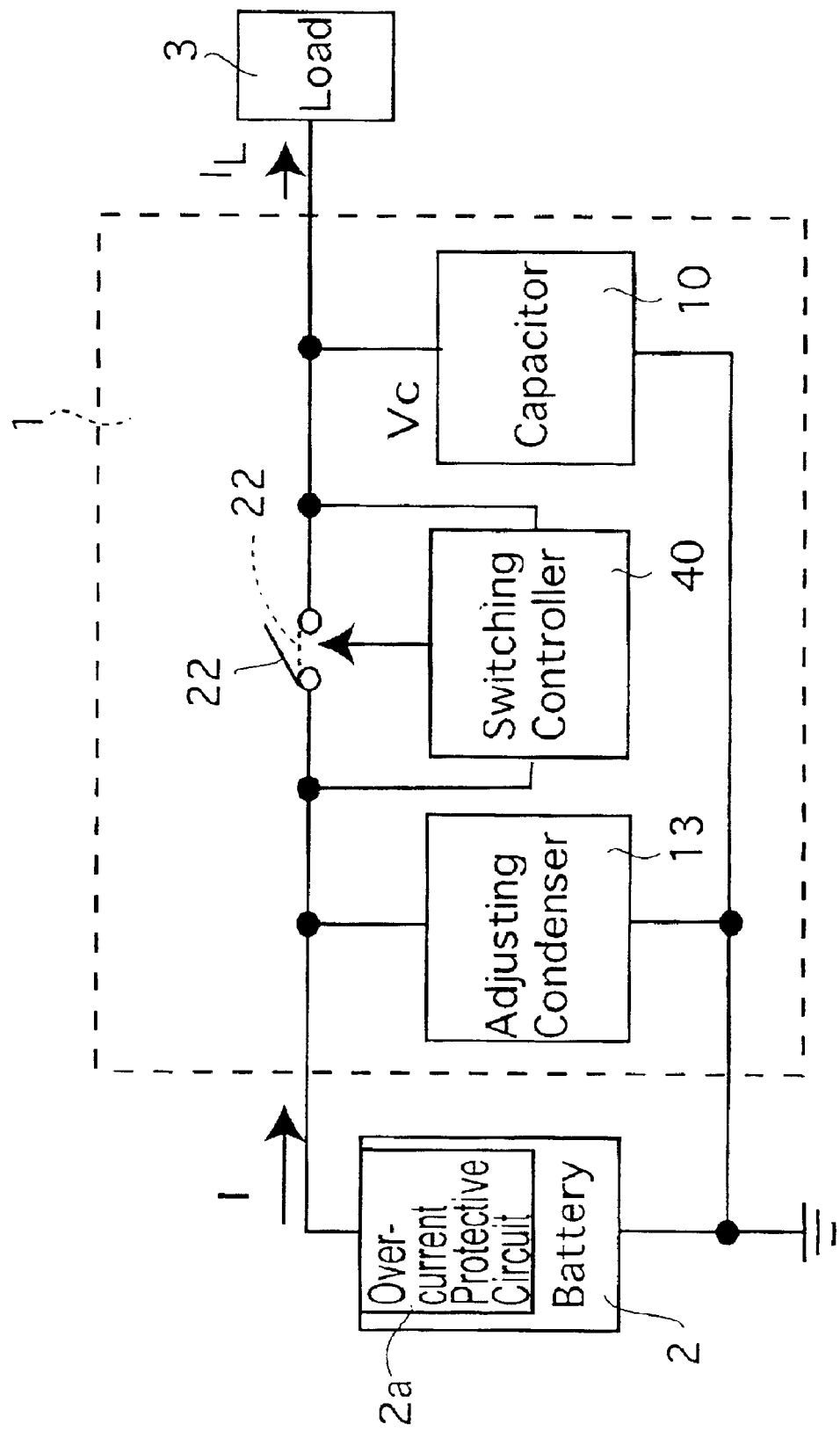
FIG. 12 is a block diagram of the seventh embodiment of the power supply circuit to which the present invention is applied.

FIG. 12 is a circuit diagram of the seventh embodiment of the power supply circuit to which the present invention is applied. The seventh embodiment of the power supply circuit 1 is provided with a capacitor 10, an adjusting condenser 13, a switching element 22 and a switching controller (restricting device/charge control device) 40. The switching controller 40 serves as a charge control device. Elements of the seventh embodiment shown in FIG. 12 which substantially function in the same manner as those of the first embodiment shown in FIG. 2 are designated by the same reference numerals.

The adjusting condenser 13 is connected in parallel to the battery 2 and functions as a power source for charging the capacitor 10 while being charged with power of the battery 2. The adjusting condenser 13 also functions to absorb the noise generated by the switching operation of the switching element 22. The adjusting condenser 13 only needs to have a capacitance wherein the overcurrent protective circuit 2a is not actuated to interrupt the electric current output from the battery 2 to the power supply circuit 1 even if the adjusting condenser 13 is directly connected to the battery 2. If this requirement is satisfied, an electric double layer capacitor can be used as the adjusting condenser 13. Alternatively, plurality of condensers in parallel can also be used as the adjusting condenser 13.

The switching element 22 is controlled by the switching controller 40. In a state where the switching element 22 is OFF, the battery 2 and the adjusting condenser 13 are disconnected from the capacitor 10, so that only the adjusting condenser 13 is charged with the battery 2. In a state where the switching element 22 is ON, the battery 2 and the adjusting condenser 13 are connected to the capacitor 10, so that the capacitor 10 is charged with the adjusting condenser 13 and the battery 2. Therefore, if the switching element 22 is controlled to open and close by the switching controller 40, the capacitor 10 is charged intermittently.

The time at which the switching operation of the switching element 22 starts and stops can be freely determined. However, it is preferable that the switching operation of the switching element 22 starts at the time the terminal voltage Vc across the capacitor 10 is equal or smaller than a predetermined voltage level and that switching operation of the switching element 22 stops at the time the terminal voltage Vc across the capacitor 10 exceeds the predetermined voltage level.

The duration of an ON state of the switching element 22 is determined so that the overcurrent protective circuit 2a is not actuated to interrupt the electric current output from the battery 2 to the power supply circuit 1. For instance, the duration can be determined to be shorter than the time necessary for the overcurrent protective circuit 2a to detect the overcurrent of the battery 2, or can be determined to correspond to the sum of the time necessary for the adjusting condenser 13 to fully discharge the accumulated charge thereof and the prescribed time necessary for the overcurrent protective circuit 2a to detect the overcurrent of the battery 2. On the other hand, it is preferable that the duration of an OFF state of the switching element 22 is determined to correspond to the time necessary for charging the adjusting condenser 13 fully, but is not limited to this particular time.

Figure 13:
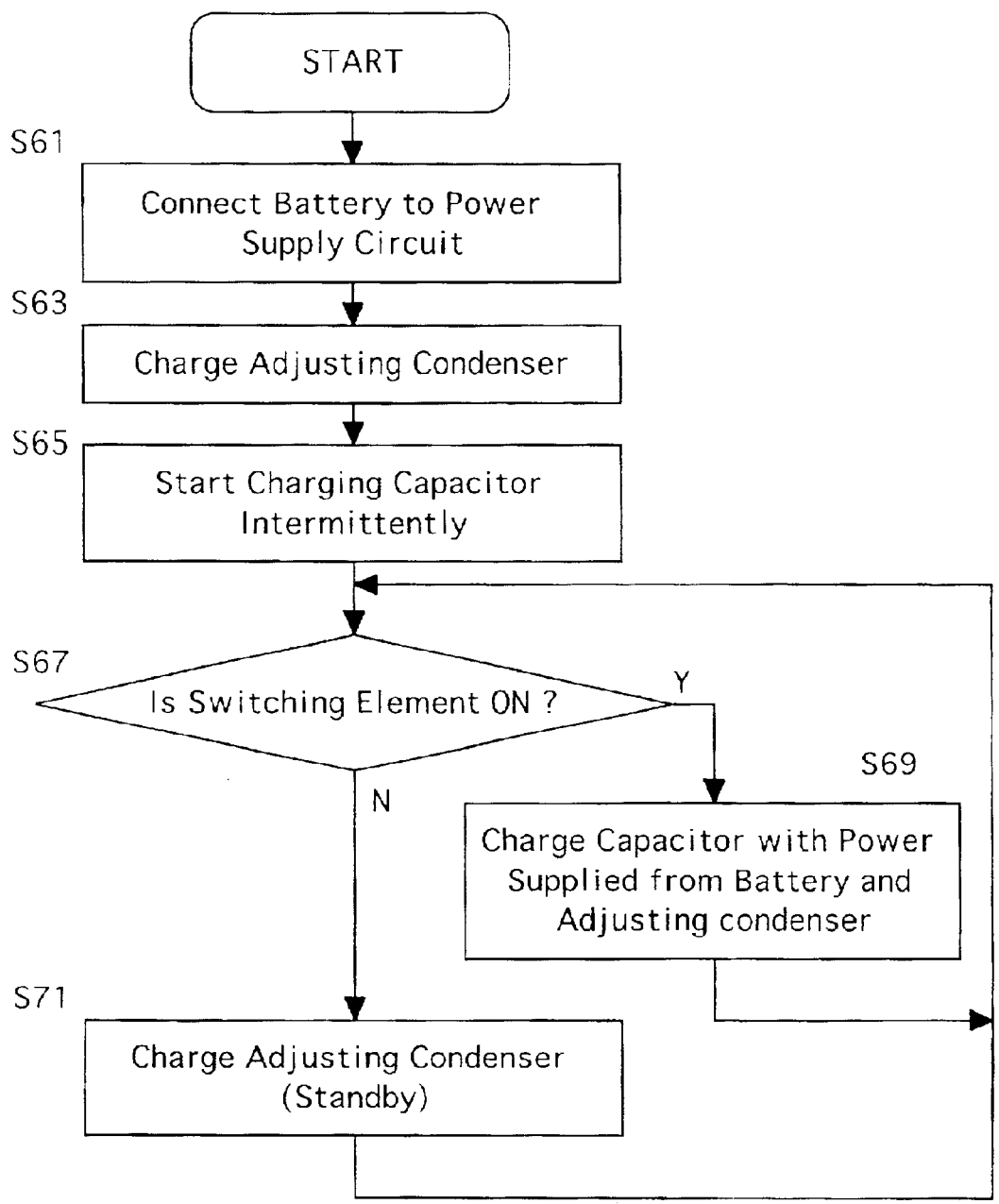
FIG. 13 is a flow chart of a charge control process for the seventh embodiment of the power supply circuit shown in FIG. 12.

FIG. 13 a flow chart of a charge control process for charging the capacitor 10 in the seventh embodiment of the power supply circuit. Immediately after the battery 2 is connected to the power supply circuit 1 (step S61), the adjusting condenser 13 is charged with the output of the battery 2 (step S63). Subsequently, the switching controller 40 actuates the switching element 22 to perform the switching operation thereof to charge the capacitor 10 intermittently (step S65). Subsequently, if the switching element is ON (if "YES" at step S67), the power supply circuit is in a charging state in which the battery 2 and the adjusting condenser 13 together supply power to the capacitor 10 to charge the capacitor 10 since the battery 2 and the adjusting condenser 13 are connected to the capacitor 10 (step S69). On the other hand, if the switching element is OFF (if "NO" at step S67), the power supply circuit is in a standby state in which only the adjusting condenser is charged (step S71). Accordingly, the charging state (step S69) and the standby state (step S71) alternately switch to thereby charge the capacitor 10 intermittently.

The output current of the battery 2 is not directly involved with the charging operation for charging the capacitor 10 in a state where the switching element 22 is OFF, but is used for the charging operation for charging the adjusting condenser 13. Namely, the output current of the battery 2 together with the output current of the adjusting condenser 13 is supplied to the capacitor 10 in a state where the switching element 22 is ON. Accordingly, the battery 2 supplies charging power to the capacitor 10 even in a state where the switching element is OFF. Therefore, the recharge time of the capacitor 10 can be made shorter than the case where the capacitor 10 is charged intermittently only with the output of the battery 2 without utilizing the adjusting condenser 13.

Figure 14:
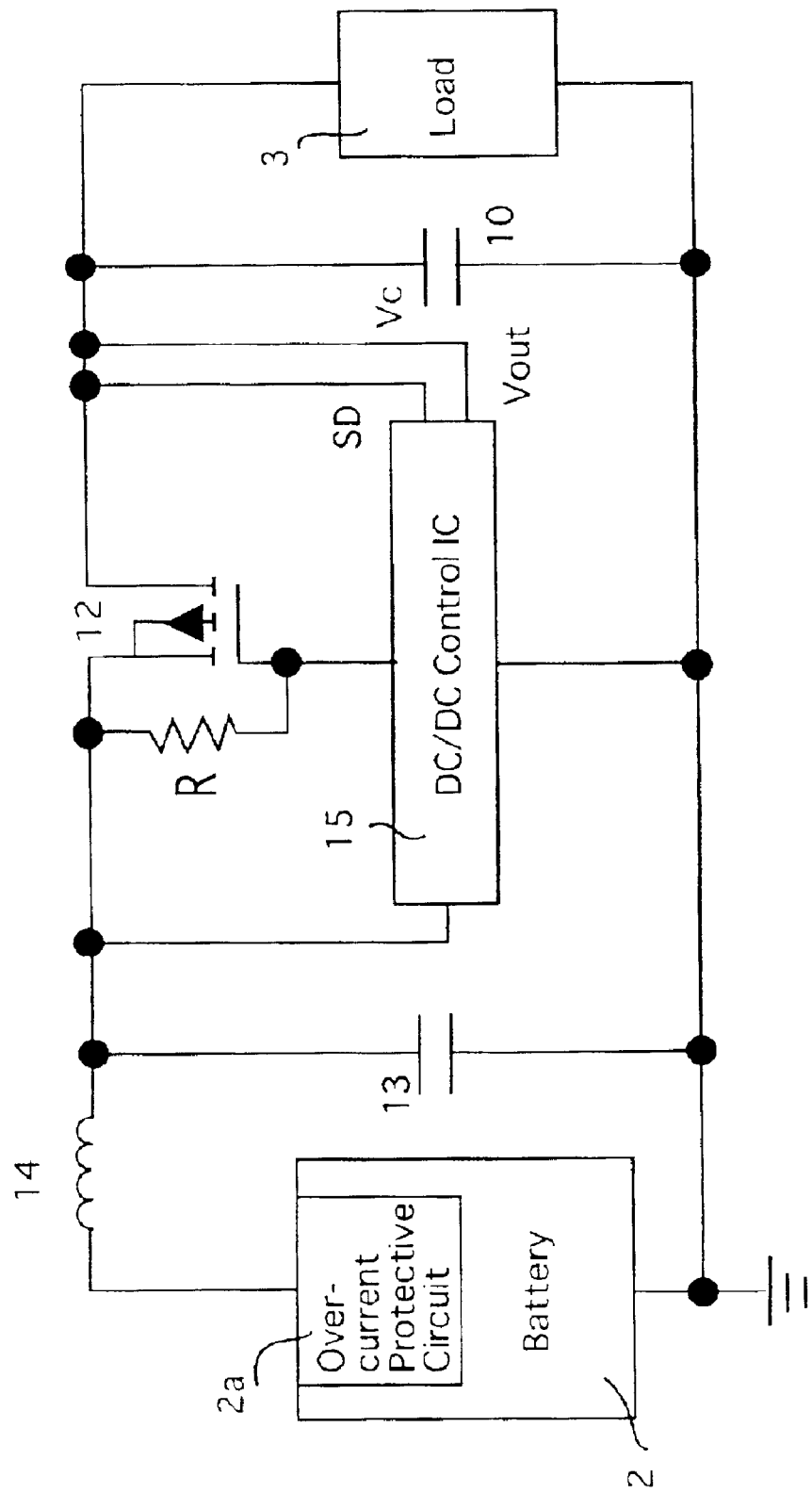
FIG. 14 is a block diagram of the eighth embodiment of the power supply circuit to which the present invention is applied.

FIG. 14 is a circuit diagram of the eighth embodiment of the power supply circuit to which the present invention is applied. The eighth embodiment of the power supply circuit is similar to the seventh embodiment shown in FIG. 12 and is constructed with more specific elements than the seventh embodiment of the power supply circuit. The eighth embodiment of the power supply circuit 1 is provided with a MOSFET (p-channel MOSFET) 12 serving as the switching element 22 shown in FIG. 12, and a DC-DC control IC 15 serving as the switching controller (charge control circuit) 40 shown in FIG. 12. The MOSFET 12 and the DC-DC control IC 15 constitute a restricting device/charge control device. The adjusting condenser 13 is connected in parallel to the battery 2 via a coil 14. The adjusting condenser 13 and the coil 14 together function as a noise filter for filtering the noise generated by the switching operation of the MOSFET 12. The adjusting condenser 13 can solely filter the noise generated by the switching operation of the DC-DC control IC 15, however, by providing a filter circuit having the coil 14 inserted therein, noise can be further filtered out.

The DC-DC control IC 15 is of a type which steps up the input direct-current voltage. The DC-DC control IC 15 is provided with a power terminal connected to the battery 2 via the coil 14. The DC-DC control IC 15 is further provided with a shutdown terminal SD and a monitor terminal Vout which are connected to the path between the drain of the MOSFET 12 and the capacitor 10. The shutdown terminal SD is provided to turn ON and OFF the DC-DC control IC 15, while the monitor terminal Vout is provided to monitor the terminal voltage Vc across the capacitor 10.

If the terminal voltage Vc across the capacitor 10 is equal to or smaller than a predetermined threshold value, the DC-DC control IC 15 actuates the MOSFET 12 to perform the switching operation thereof to intermittently charge the capacitor 10 with the power of the battery 2 and the adjusting condenser 13. On the other hand, the DC-DC control IC 15 stops the switching operation of the MOSFET 12 to hold the MOSFET 12 in an ON state if the terminal voltage Vc across the capacitor 10 exceeds the predetermined threshold value. In a state where the MOSFET 12 is ON, the capacitor 10 is charged with the adjusting condenser 13 and the battery 2. Furthermore, in a state where the MOSFET 12 is ON, since the load 3 is supplied with power from the battery 2, the adjusting condenser 13, and the capacitor 10, the power supply circuit 1 can deal with the variation of the current that the load 3 consumes in a versatile manner.

Thereafter, if the terminal voltage Vc across the capacitor 10 again becomes equal to or smaller than the predetermined threshold value, the DC-DC control IC 15 again actuates the MOSFET 12 to perform the switching operation thereof to intermittently charge the capacitor 10 with the power of the battery 2 and the adjusting condenser 13.

Whether the MOSFET 12 is held in an ON state or an OFF state at the time the switching operation stops is determined depending on the types of the DC-DC control IC 15 and the MOSFET 12 that are used in combination.

For instance, in the case where a DC-DC control IC for stepping up the input direct-current voltage which is provided with a shutdown terminal is used, the MOSFET 12 is held in an ON state at the time the switching operation stops if a p-channel MOSFET is used as the MOSFET 12. On the other hand, if an n-channel MOSFET is used as the MOSFET 12, the MOSFET 12 is held in an OFF state at the time the switching operation stops.

In the case where the DC-DC control IC for stepping up the input direct-current voltage, which is provided with no shutdown terminal, and a p-channel MOSFET are used, the DC-DC control IC does not stop the switching operation thereof, which makes it possible to make the intermittent charging operation perform at all times.

As can be understood from the above descriptions, in each of the seventh and eighth embodiments, a large electric current is not drawn from the battery 2 since the capacitor 10 is charged intermittently with the battery 2 and the adjusting condenser 13. Therefore, the output current of the battery 2 is not interrupted by the overcurrent protective circuit 2a while the capacitor 10 is being charged.

In each of the seventh and eighth embodiments, the charging efficiency per charge is improved since the adjusting condenser is charged while the capacitor 10 is not charged and since the adjusting condenser is charged with the battery 2 and the adjusting condenser 13 while the capacitor 10 is charged. Therefore, the recharge time of the capacitor 10 can be made shorter than in the case where the capacitor 10 is charged intermittently with only the output of the battery 2. Furthermore, a complicated circuit for preventing the output current of the battery 2 from being interrupted by the overcurrent protective circuit 2a while the capacitor 10 is being charged does not have to be provided.

Furthermore, in each of the seventh and eighth embodiments, the noise generated by the switching operation of the switching element 22 (the MOSFET 12) can be absorbed by the arrangement of the adjusting condenser 13 connected in parallel to the battery 2.

Figure 15:
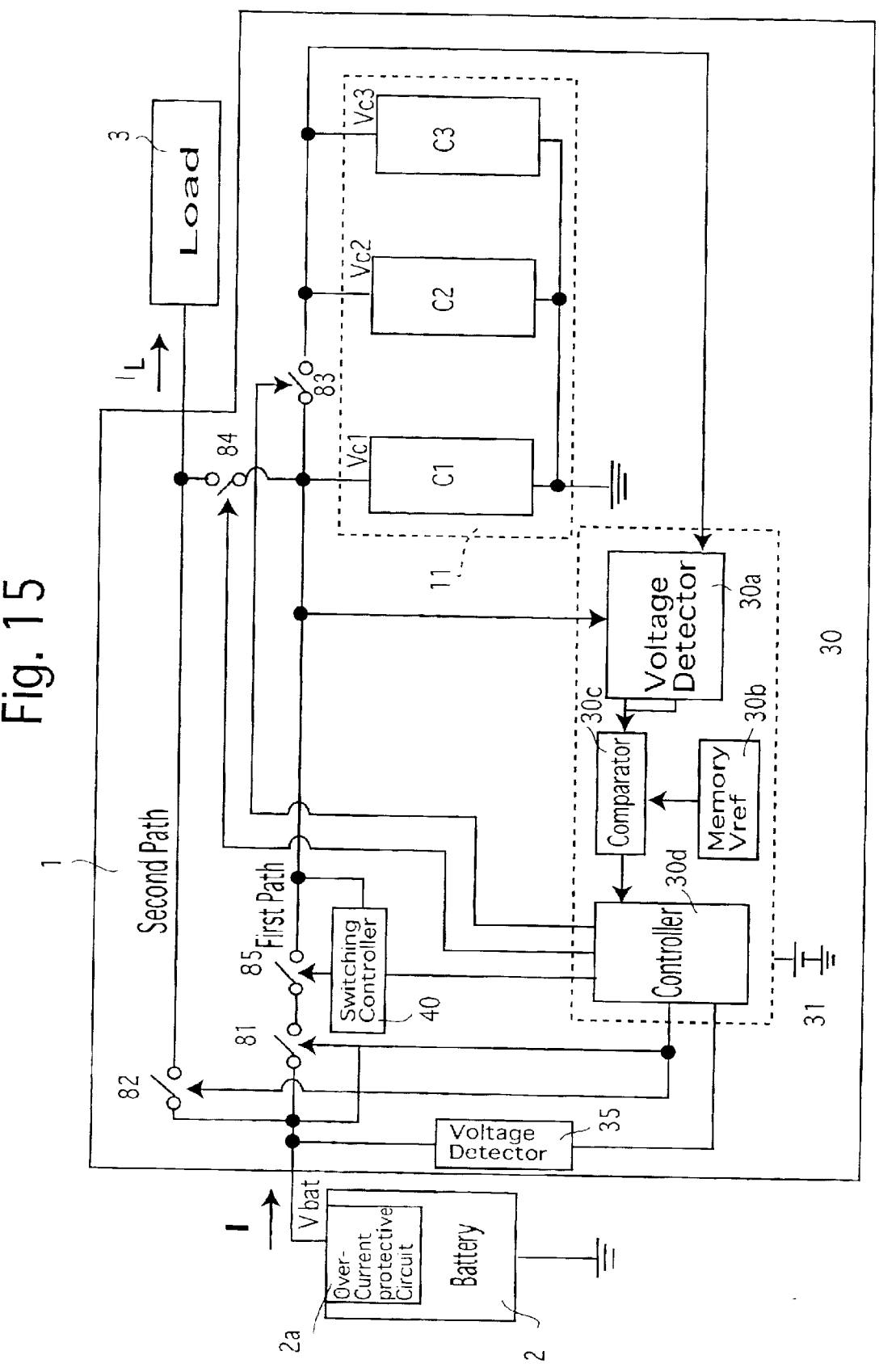
FIG. 15 is a block diagram of the ninth embodiment of the power supply circuit to which the present invention is applied.

FIG. 15 is a circuit diagram of the ninth embodiment of the power supply circuit to which the present invention is applied. The ninth embodiment of the power supply circuit 1 is provided with a group of capacitors 11, a microcomputer (restricting device/charge control device) 30, a backup power supply 31, a voltage detector 35 and a switching controller 40. Elements of the ninth embodiment shown in FIG. 15 which substantially function in the same manner as those of the first embodiment shown in FIG. 2 are designated by the same reference numerals.

The group of capacitors 11 include a first, second and third capacitor C1, C2 and C3. The first capacitor C1 is connected in parallel to battery 2. The second and third capacitors C2 and C3 are connected in parallel to the first capacitor C1. The second and third capacitor C2 and C3 are maintained at substantially the same potential since they are connected in parallel. The group of capacitors 11 constitute a large-capacitance type of capacitor which can actuate the overcurrent protective circuit 2a to interrupt the electric current output from the battery 2 to the power supply circuit 1 if the group of capacitors 11 are directly connected to the battery 2. Each capacitor (first, second, and third capacitors C1, C2 and C3) of the group of capacitors 11 can be an electric double layer capacitor.

The ninth embodiment of the power supply circuit 1 is provided with first through fifth switches 81 through 85 which constitute a switching device. The first and fifth switches 81 and 85 are provided to connect and disconnect the battery 2 to and from the group of capacitors 11. The second switch 82 is provided to connect and disconnect the battery 2 to and from the load 3. The third switch 83 is provided to connect and disconnect the first capacitor C1 to and from the second and third capacitors C2 and C3. The fourth switch 84 is provided to connect and disconnect the first capacitor C1 to and from the load 3. Each of the first through fifth switches 81 through 85 is controlled to be turned ON and OFF by the microcomputer 30.

The voltage detector 35 monitors the output voltage of the battery 2 to detect whether the output voltage of the battery 2 has reached a final voltage Vs thereof. The switching controller 40 receives power from the battery 2 to turn ON and OFF the fifth switch 85 (i.e., to perform the switching operation thereof) to charge the capacitor C1 up to a predetermined level. The switching controller 40 is also controlled by the microcomputer 30.

The process of charging the group of capacitors 11 will be hereinafter discussed. Firstly, the terminal voltage Vc1 across the first capacitor C1 is detected. If the detected terminal voltage Vc1 is smaller than a first reference voltage Vref1 which is compared with the terminal voltage Vc1 to determine whether the capacitor C1 is in a fully charged condition, a main charging operation in which the capacitor C1 is charged intermittently with the first capacitor C1 being disconnected from the second and third capacitors C2 and C3. Note that the first reference voltage Vref1 is a predetermined voltage value which is a divided voltage value of the terminal voltage when the capacitor C1 is fully charged.

If the first capacitor C1 has been fully charged, the first capacitor C1 being disconnected from the battery 2, and the first capacitor C1 is connected to the second and third capacitors C2 and C3. Accordingly, part of the accumulated charge of the first capacitor C1 flows into the second and third capacitors C2 and C3 to thereby charge the second and third capacitors C2 and C3. This charging operation of the second and third capacitors C2 and C3 with the accumulated charge of the first capacitor C1 is hereinafter referred to as "relay charging operation".

If the terminal voltage Vc1 across the first capacitor C1 becomes equal to the terminal voltage Vc3 across the third capacitor C3 via the relay charging operation, the terminal voltage Vc3 across the third capacitor C3 is compared with a second reference voltage Vref2 to determine whether the output current of the battery 2 can be prevented from being interrupted by the overcurrent protective circuit 2a. If the terminal voltage Vc3 across the third capacitor C3 is smaller than the second reference voltage Vref2, the first capacitor C1 is disconnected from the second and third capacitors C2 and C3 to alternately repeat the main charging operation (in which the first capacitor C1 is charged intermittently) and the relay charging operation (in which the second and third capacitors C2 and C3 are charged with the accumulated charge of the first capacitor C1) until the terminal voltage Vc3 across the third capacitor C3 becomes equal to or greater than the second reference value Vref2.

Figure 16:
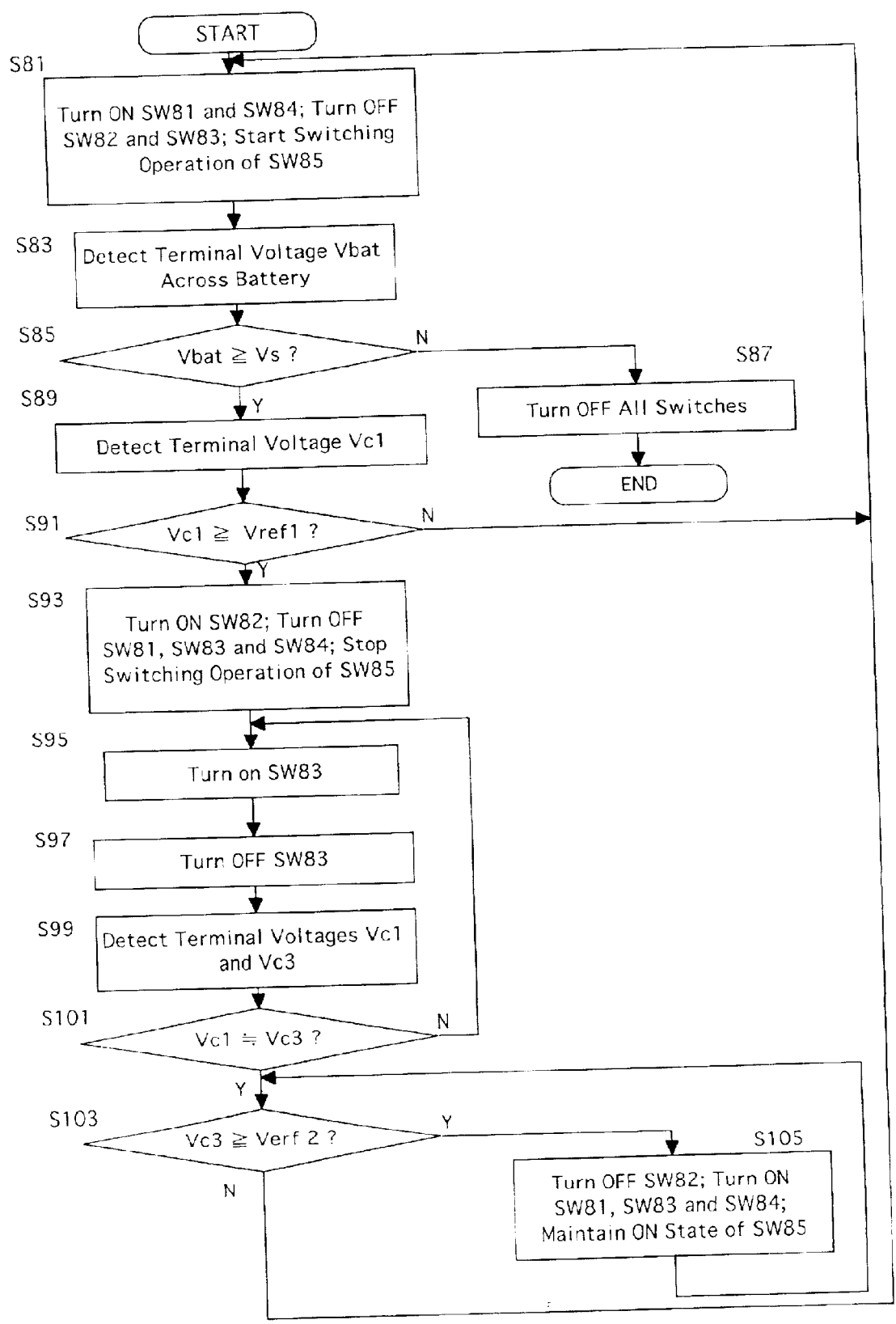
FIG. 16 is a flow chart of a charge control process for the ninth embodiment of the power supply circuit shown in FIG. 15.

A charge control process for charging the group of capacitors 11 in the ninth embodiment of the power supply circuit will be hereinafter discussed in detail with reference to the flow chart shown in FIG. 16. The microcomputer 30 performs the charge control process each time the battery 2 is connected to the power supply circuit 1.

In the charge control process, firstly the first and fourth switches 81 and 84 are turned ON while the second and third switches 82 and 83 are turned OFF to start the switching operation of the fifth switch 85 via the switching controller 40 (step S81). Due to the ON state of the first switch 81 and the switching operation of the fifth switch 85, the first capacitor C1 is charged intermittently. During the main charging operation, the battery 2 and the first capacitor C1 supply power to the load 3 since the fourth switch 84 is ON.

Thereafter a terminal voltage Vbat across the battery 2 is detected via the voltage detector 39 (step S83), and it is determined whether the detected terminal voltage Vbat is equal to or greater than the final voltage Vs (step S85). If the detected terminal voltage Vbat is smaller than the final voltage Vs (if "NO" at step S85), this means that the battery 2 is empty, so that all the first through fifth switches 81 through 85 are turned OFF (step S87), and control ends. The final voltage Vs is predetermined to be smaller than each of the aforementioned first reference voltage Vref1 that is used to determine whether the capacitor C1 is in a fully charged condition, and the aforementioned second reference voltage Vref2 that is used to determine whether the output current of the battery 2 can be prevented from being interrupted by the overcurrent protective circuit 2a.

If it is determined that the terminal voltage Vbat across the battery 2 is equal to or greater than the final voltage Vs (if "YES" at step S85), the terminal voltage Vc1 across the first capacitor C1 is detected (step S89), and it is determined whether the detected terminal voltage Vc1 is equal to or greater than the first reference voltage Vref1 (step S91). If the terminal voltage Vc1 is smaller than the first reference voltage Vref1 (if "NO" at step S91), control returns to step S81 to continue to intermittently charge the first capacitor C1. If the terminal voltage Vc1 is equal to or greater than the first reference voltage Vref1 (if "YES" at step S91), this means that the first capacitor C1 is in a fully charged condition, so that the second switch 82 is turned ON while the first, third and fourth switches 81, 83 and 84 are turned OFF to stop the switching operation of the fifth switch 85 via the switching controller 40 (step S93). The fifth switch 85 is held in an ON state at the time the switching operation of the fifth switch 85 stops. The OFF state of the first switch 81 and the halt on the switching operation of the fifth switch 85 cause the main charging operation to stop.

Subsequently, the third switch 83 is turned ON (step S95). Upon the third switch 83 being turned ON, the relay charging operation starts. In other words, immediately after the third switch 83 is turned ON, a closed circuit consisting of the first, second and third capacitors C1, C2 and C3 wherein the first capacitor C1 is connected in parallel to the second and third capacitors C2 and C3 is established. This causes part of the accumulated charge of the first capacitor C1 to flow into the second and third capacitors C2 and C3 instantaneously to thereby charge the second and third capacitors C2 and C3, so that the terminal voltages Vc1, Vc2 and Vc3 across the first, second and third capacitors C1, C2 and C3, respectively, become substantially equal to one another.

Subsequently, the third switch 83 is turned OFF (step S97 the terminal voltage Vc1 across the first capacitor C1 and the terminal voltage Vc3 across the third capacitor C3 are detected (step S99), and the detected terminal voltage Vc1 across the first capacitor C1 is compared with the detected terminal voltage Vc3 across the third capacitor C3 with the first capacitor C1 being disconnected from the second and third capacitors C2 and C3 (step S101). If the terminal voltage Vc1 and the terminal voltage Vc3 are not substantially equal to each other (if "NO" at step S101), control returns to step S95. During the relay charging operation (which includes the operation at step S93), the second switch 82 is ON while the fourth switch 84 is OFF, so that only the battery 2 supplies power to the load 3. If the terminal voltage Vc1 and the terminal voltage Vc3 become substantially equal to each other (if "YES" at step S101), it is determined whether the detected terminal voltage Vc3 across the third capacitor C3 is greater than or equal to the second reference voltage Vref2 (step S103). As described above, the second reference voltage Vref2 is used to determine whether the output current of the battery 2 can be prevented from being interrupted by the overcurrent protective circuit 2a.

If it is determined that the terminal voltage Vc3 across the third capacitor C3 is smaller than the second reference voltage Vref2 (if "NO" at step S103), there is a possibility that the overcurrent protective circuit 2a will be actuated to interrupt the electric current output from the battery 2 to the power supply circuit 1, so that control returns to step S81 to repeat the operations from step S81 to step S103 until the terminal voltage Vc3 becomes equal to or greater than the second reference voltage Vref2. Namely, the main charging operation (in which the first capacitor C1 is charged intermittently) and the relay charging operation (in which the second and third capacitors C2 and C3 are charged with the accumulated charge of the first capacitor C1) are repeated alternately until the terminal voltage Vc3 across the third capacitor C3 becomes equal to or greater than the second reference value Vref2.

As described above, the battery 2 and the first capacitor C1 supply power to the load 3 during the main charging operation, while only the battery 2 supplies power to the load 3 during the relay charging operation.

If it is determined that the terminal voltage Vc3 across the third capacitor C3 is equal to or greater than the second reference voltage Vref2 (if "YES" at step S103), control proceeds to step S105 at which the second switch 82 is turned OFF, the first, third and fourth switches 81, 83 and 84 are turned ON, and the fifth switch 85 is held in an ON state via the switching controller 40. Subsequently, control returns to step S103.

The state where only the second switch 82 is OFF is maintained as long as the terminal voltage Vc3 across the third capacitor C3 is equal to or greater than the second reference voltage Vref2 (steps S103 and S105). In this state, the battery 2 and the group of capacitors 11 supply power to the load 3.

If it is determined that the terminal voltage Vc3 across the third capacitor C3 is smaller than the second reference voltage Vref2 (if "NO" at step S103), control returns to step S81 to alternately repeat the main charging operation and the relay charging operation until the terminal voltage Vc3 across the third capacitor C3 becomes equal to or greater than the second reference value Vref2.

Figure 17:
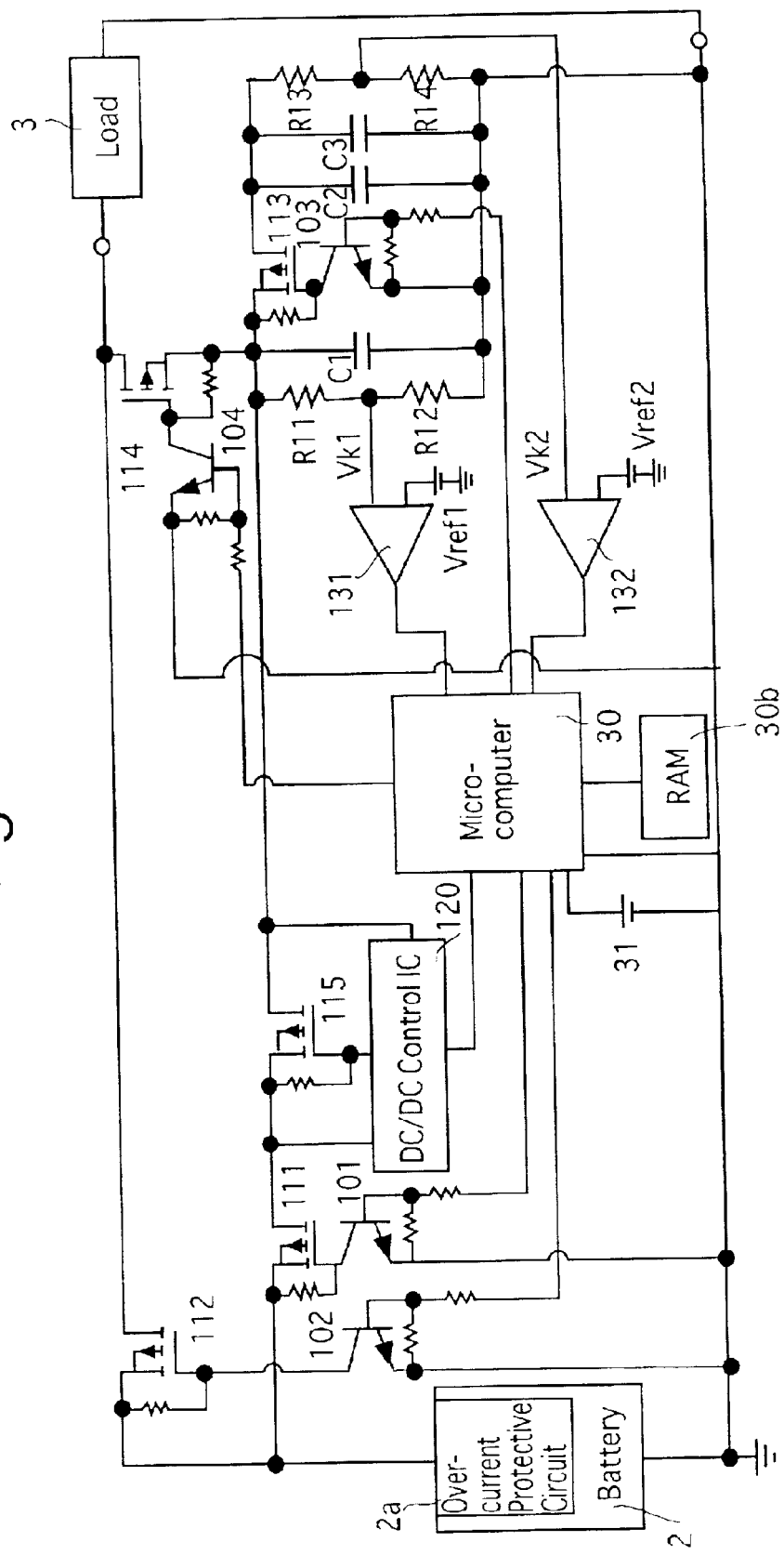
FIG. 17 is a block diagram of the tenth embodiment of the power supply circuit to which the present invention is applied.

FIG. 17 is a circuit diagram of the tenth embodiment of the power supply circuit to which the present invention is applied. The tenth embodiment of the power supply circuit is similar to the ninth embodiment shown in FIG. 15 and is constructed with more specific elements than the ninth embodiment of the power supply circuit. The tenth embodiment of the power supply circuit 1 is provided with first through fourth transistors 101, 102, 103 and 104 and first through fifth MOSFETs 111, 112, 113, 114 and 115. The first transistor 101 and the first MOSFET 111 together serve as the first switch 81 shown in FIG. 15. The second transistor 102 and the second MOSFET 112 together serve as the second switch 82 shown in FIG. 15. The third transistor 103 and the third MOSFET 113 together serve as the third switch 83 shown in FIG. 15. The fourth transistor 104 and the fourth MOSFET 114 together serve as the fourth switch 84 shown in FIG. 15. The fifth MOSFET 115 serves as the fifth switch 85 shown in FIG. 15.

The emitter of the first transistor 101 is grounded, while the collector and the base of the first transistor 101 are connected to the gate of the first MOSFET 111 and the microcomputer (restricting device/charge control device) 30, respectively. The first transistor 101 operates in accordance with the output of the microcomputer 30 to change the ON/OFF state of the first MOSFET 111. Namely, when the first transistor 101 is in an ON state, the voltage across the gate and the source of the first MOSFET 111 becomes maximum to thereby turn ON the first MOSFET 111. On the other hand, when the first transistor 101 is in an OFF state, the gate and the source of the first MOSFET 111 are maintained at the same potential, so that the first MOSFET 111 is turned OFF.

Likewise, the second, third and fourth MOSFETs 112, 113 and 114 are ON when the second, third and fourth transistors 102, 103 and 104 are in an ON state, respectively, while the second, third and fourth MOSFETs 112, 113 and 114 are OFF when the second, third and fourth transistors 102, 103 and 104 are in an OFF state, respectively.

A DC-DC control IC 120 which controls the gate voltage of the fifth MOSFET 115 to change the ON/OFF state thereof is connected to the fifth MOSTET 115. The DC-DC control IC 120 controls the fifth MOSFET 115 to turn the same ON and OFF in accordance with the output of the microcomputer 30.

The microcomputer 30 controls the first through fourth transistors 101 through 104 and the DC-DC control IC 120 in accordance with the outputs of first and second comparators 131 and 132.

The first comparator 131 inputs the first reference voltage Vref1 and a first divided voltage Vk1, and compares the first reference voltage Vref1 with the first divided voltage Vk1, and outputs the result of this comparison to the microcomputer 30. The terminal voltage Vc1 across the first capacitor C1 divided via the resistors R11 and R12 represents the first divided voltage Vk1. The voltage on the first capacitor C1 in a fully charged condition divided by the same ratio as the ratio of the resistance of the resistor R11 and the resistance of the resistor R12 represents the first reference voltage Vref1. Therefore, the first comparator 131 outputs a low-level voltage if the first divided voltage Vk1 is smaller than the first reference voltage Vref1, and the first comparator 131 outputs a high-level voltage if the first divided voltage Vk1 is equal to or greater than the first reference voltage Vref1.

The second comparator 132 inputs the second reference voltage Vref2 and a second divided voltage Vk2, and compares the second reference voltage Vref2 with the second divided voltage Vk2, and outputs the result of this comparison to the microcomputer 30. The terminal voltage Vc3 across the third capacitor C3 divided via the resistors R13 and R14 represents the second divided voltage Vk2. The second reference voltage Vref2 is a threshold voltage at which the output current of the battery 2 can be prevented from being interrupted by the overcurrent protective circuit 2a. Therefore, the second comparator 132 outputs a low-level voltage if the second divided voltage Vk2 is smaller than the second reference voltage Vref2, while the second comparator 132 outputs a high-level voltage if the second divided voltage Vk2 is equal to or greater than the second reference voltage Vref2.

If each of the first and second comparators 131 and 132 outputs a low-level voltage the microcomputer 30 turns OFF the second and third transistors 102 and 103 and at the same time turns ON the first and fourth transistors 101 and 104 to start the switching operation of the fifth MOSFET 115 via the DC-DC control IC 120. Namely, the battery 2 and the first capacitor C1 supply power to the load 3 while the first capacitor C1 is being charged in a state where there is a possibility that the electric current output from the battery 2 to the power supply circuit 1 may be interrupted by the overcurrent protective circuit 2a if the battery 2 is connected to the group of capacitors 11 (C1, C2 and C3) for more than a predetermined period of time, and where the first capacitor C1 is not yet in a fully charged condition.

The microcomputer 30 turns OFF the first and fourth transistors 101 and 104 and at the same time turns ON the second and third transistors 102 and 103 to stop the switching operation of the fifth MOSFET 115 via the DC-DC control IC 120 if the first and second comparators 131 and 132 output a high-level voltage and a low-level voltage, respectively. Namely, if the first capacitor C1 is only in a fully charged condition, the second and third capacitors C2 and C3 are charged with the accumulated charge of the first capacitor C1 while the battery 2 supplies power to the load 3 even in a state where there is a possibility that the electric current output from the battery 2 to the power supply circuit 1 may be interrupted by the overcurrent protective circuit 2a if the battery 2 is connected to the group of capacitors 11 (C1, C2 and C3) for more than a predetermined period of time.

If each of the first and second comparators 131 and 132 outputs a high-level voltage, the microcomputer 30 turns OFF the second transistor 102 and at the same time turns ON the first, third and fourth transistors 101, 103 and 104 to fix the fifth MOSFET 115 at an ON state via the DC-DC control IC 120. Namely, the battery 2 is connected to the group of capacitors 11 so that the battery 2 and the group of capacitors 11 supply power to the load 3 in a state where there is no possibility that the electric current output from the battery 2 to the power supply circuit 1 can be interrupted by the overcurrent protective circuit 2a even if the battery 2 is connected to the group of capacitors 11 (C1, C2 and C3) for more than a predetermined period of time.

As can be understood from the above descriptions, in each of the ninth and tenth embodiments, since the main charging operation (in which the first capacitor C1 is intermittently charged with the first capacitor C1 being disconnected from the second and third capacitors C2 and C3) and the relay charging operation (in which the second and third capacitors C2 and C3 are charged with the accumulated charge of the first capacitor C1 with the first capacitor C1 being disconnected from the battery 2) are repeated alternately, the output current of the battery 2 can be prevented from being interrupted by the overcurrent protective circuit 2a even if more than one capacitor is connected in parallel to the battery 2. Furthermore, a switching circuit or the like does not have to be provided for each of the second and third capacitors C2 and C3, which makes it possible to downsize the power supply circuit 1.

The number of capacitors provided in the group of capacitors 11 can be any number, but is preferably determined with consideration given to the characteristic of the battery used and the current usage state of the battery. The capacitors provided in the group of capacitors 11 can be connected not only in parallel but also in series.

Since a plurality of capacitors can be used in series, a construction wherein a large number of capacitors are used is also possible. Furthermore, if a large number of capacitors are installed in electronic components of the power supply circuit of the present invention, since there is an increased freedom of the arrangement of the capacitors, such electronic components can be constructed smaller.

In each of all the aforementioned first through tenth embodiments, it is assumed that an electric double layer capacitor is used as each capacitor, however, any like element can be used as each capacitor.

As can be understood from the foregoing, according to a power supply circuit to which the present invention is applied, when the capacitor is charged while restricting the output current of the battery, the output current of the battery is not interrupted by the overcurrent protective circuit even while the capacitor is being charged.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A power supply circuit which is connected to a battery having an overcurrent protective device, said power supply circuit comprising:

a capacitor which is connected in parallel to said battery to be charged by said battery;

a voltage detector which detects a terminal voltage across said capacitor; and a restricting device that includes a variable resistor via which said battery is connected to said capacitor, and a controller which controls said output current of said battery by varying a resistance value of said variable resistor in accordance with said terminal voltage detected by said voltage detector, said restricting device restricting an output current of said battery so that said output current of said battery is not interrupted by said overcurrent protective device while said capacitor is being charged with said battery, wherein said variable resistor comprises a plurality of resistors and a corresponding group of switches for switching ON/OFF states of said plurality of resistors.

2. The power supply circuit according to claim 1, wherein said plurality of resistors are connected in parallel;

wherein each of said plurality of resistors can be connected to and disconnected from one of said battery and said capacitor using said group of switches; and wherein said controller controls said group of switches independently of one another in accordance with said terminal voltage detected by said voltage detector.

3. The power supply circuit according to claim 1, wherein said capacitor comprises an electric double layer capacitor.

4. The power supply circuit according to claim 1, wherein said battery comprises a rechargeable battery.

5. The power supply circuit which is connected to a battery having an overcurrent protective device according to claim 1, said restricting device further comprising a memory that stores a threshold value that is determined in advance in accordance with said plurality of resistors; and a comparator that compares said threshold value with said terminal voltage detected by said voltage detector when said controller changes said switching ON/OFF state of said plurality of resistors.

6. A power supply circuit which is connected to a battery having an overcurrent protective device, said power supply circuit comprising:

a capacitor which is connected in parallel to said battery to be charged by said battery;

a restricting device that includes a transistor and a controller that controls a base voltage of said transistor, the restricting device restricting an output current of said battery so that said output current of said battery is not interrupted by said overcurrent protective device while said capacitor is being charged with said battery; and a voltage detector which detects a terminal voltage across said capacitor, wherein said restricting device restricts said output current of said battery in accordance with said terminal voltage detected by said voltage detector;

wherein a collector of said transistor is connected to a gate of a field effect transistor while an emitter of said transistor is connected to ground, and wherein said controller controls said voltage across said gate and a source of said field effect transistor by controlling the base voltage of said transistor.

7. The power supply circuit according to claim 6, wherein said battery is connected to said capacitor via the field effect transistor; and wherein said controller controls said output current of said battery by controlling the voltage across the gate and the source of said field effect transistor in accordance with said terminal voltage detected by said voltage detector.

8. The power supply circuit according to claim 6, wherein said restricting device restricts said output current of said battery in accordance with said terminal voltage detected by said voltage detector so that said output current of said battery becomes maximum within a range in which said overcurrent protective device is not actuated to interrupt said output current of said battery to said power supply circuit.

9. The power supply circuit according to claim 6, further comprising:
- a plurality of resistors; and
- a plurality of switches which are turned ON and OFF so that a base of said transistor is selectively connected to said ground via said plurality of resistors,
- wherein said controller controls said base voltage of said transistor by changing ON/OFF states of said plurality of switches.

10. A power supply circuit which is connected to a battery having an overcurrent protective device, said power supply circuit comprising:
- a capacitor;
- a first switch provided in a primary path for connecting said battery with said capacitor;
- a second switch provided in an alternative path for connecting said battery with said capacitor;
- a voltage detector which detects a terminal voltage across said capacitor; and a charge control device which controls a switching operation of said first switch to intermittently charge said capacitor with said battery via said primary path in the case where said terminal voltage Vc across said capacitor is smaller than a predetermined threshold value;
- wherein said charge control device switches said primary path to said alternative path to continuously charge said capacitor with said battery via said alternative path in the case where said terminal voltage across said capacitor exceeds said predetermined threshold value.

11. The power supply circuit according to claim 10, wherein a duration of an ON state of said first switch in an intermittent charging operation, in which said capacitor is charged intermittently, is shorter than a time necessary for said overcurrent protective device to detect an overcurrent of said battery.

12. The power supply circuit according to claim 10, wherein a duration of an ON state of said first switch in an intermittent charging operation, in which said capacitor is charged intermittently, is shorter than a duration from the time said battery is connected to said capacitor to the time an output current of said battery exceeds an overcurrent detection value of said overcurrent protective device.

13. A power supply circuit which is connected to a battery having an overcurrent protective device, said power supply circuit comprising:
- a capacitor;
- an adjusting condenser connected in parallel with said battery, said adjusting condenser having a capacitance so that when said capacitor is charged with said battery, said overcurrent protective device is not actuated to interrupt an output current of said battery to said power supply circuit;
- a switching element with which said adjusting condenser can be connected to and disconnected from said capacitor; and
- a charge control device which controls a switching operation of said switching element to intermittently charge said capacitor with power output from said battery and said adjusting condenser.

14. The power supply circuit according to claim 13, wherein said capacitor is charged with power output from said battery and said adjusting condenser when said switching element is ON, and wherein said capacitor is charged with power output only from said battery when said switching element is OFF.

15. The power supply circuit according to claim 13, further comprising a voltage detector which detects a terminal voltage across said capacitor;
- wherein in the case where said terminal voltage becomes one of equal to and greater than a predetermined voltage, said charge control device stops said switching operation of said switching element, and connects said battery and said adjusting condenser to said capacitor via said switching element.

16. A power supply circuit which is connected to a battery having an overcurrent protective device, said power supply circuit comprising:
- a first capacitor which can be connected in parallel to said battery;
- a second capacitor which can be connected in parallel to said first capacitor; and
- a charge control device which controls a charging operation for charging said first capacitor and a charging operation for charging said second capacitor;
- wherein said charge control device repeats a main charging operation and a relay charging operation alternately;
- wherein said first capacitor is connected to said battery with said first capacitor being disconnected from said second capacitor, in order to charge said first capacitor with said battery in said main charging operation; and
- wherein said first capacitor is connected to said second capacitor with said first capacitor being disconnected from said battery, in order to charge said second capacitor with power output from said first capacitor in said relay charging operation.

17. The power supply circuit according to claim 16, wherein said second capacitor comprises a plurality of capacitors connected in parallel.

18. The power supply circuit according to claim 16, further comprising a switching device provided between said battery and said first capacitor,
- wherein in said main charging operation, said charge control device controls a switching operation of said switching device to intermittently charge said first capacitor.

19. The power supply circuit according to claim 16, wherein said charge control device repeats said main charging operation and said relay charging operation alternately until a terminal voltage across said first capacitor becomes one of equal to and greater than a predetermined reference voltage at which an output current of said battery can be prevented from being interrupted by said overcurrent protective device.

20. The power supply circuit according to claim 16, wherein said charge control device performs said main charging operation when said terminal voltage across said first capacitor is smaller than a predetermined threshold voltage, and performs said relay charging operation when said terminal voltage across said first capacitor is one of equal to and greater than said predetermined threshold voltage.

21. The power supply circuit according to claim 16, wherein said charge control device supplies power output from said battery and said first capacitor to a load while performing said main charging operation, and wherein said charge control device supplies power output only from said battery to said load while performing said relay charging operation.

22. The power supply circuit according to claim 21, wherein in the case where said terminal voltage across said first capacitor is one of equal to and greater than a predetermined reference voltage at which an output current of said battery can be prevented from being interrupted by said overcurrent protective device, in a state where said second capacitor is connected in parallel to said first capacitor, said charge control device connects said battery to one of said first and second capacitors to supply power output from said battery and said one of said first and second capacitors to said load.

23. A power supply circuit which is connected to a battery having an overcurrent protective device, said power supply circuit comprising:

a capacitor which is connected in parallel to said battery to be charged by said battery;

a voltage detector which detects a terminal voltage across said capacitor; and a restricting device that includes a variable resistor via which said battery is connected to said capacitor, and a controller which controls said output current of said battery by varying a resistance value of said variable resistor from a high resistance value to a low resistance value as said terminal voltage detected by said voltage detector increases, said restricting device restricting an output current of said battery so that said output current of said battery is not interrupted by said overcurrent protective device while said capacitor is being charged with said battery.

* * * * *